US010430236B2

(12) United States Patent
Son et al.

(10) Patent No.: US 10,430,236 B2
(45) Date of Patent: Oct. 1, 2019

(54) ELECTRONIC DEVICE AND METHOD FOR RESUMING PROCESS THEREOF

(71) Applicant: Samsung Electronics Co., Ltd, Gyeonggi-do (KR)

(72) Inventors: Juho Son, Gyeonggi-do (KR); Byungsoo Kim, Gyeonggi-do (KR); Kyungmin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 15/461,443

(22) Filed: Mar. 16, 2017

(65) Prior Publication Data
US 2017/0269965 A1 Sep. 21, 2017

(30) Foreign Application Priority Data
Mar. 18, 2016 (KR) ........................ 10-2016-0032767

(51) Int. Cl.
*G06F 9/44* (2018.01)
*G06F 9/48* (2006.01)
*G06F 9/46* (2006.01)
*G06F 9/54* (2006.01)
*G06F 9/4401* (2018.01)

(52) U.S. Cl.
CPC .......... *G06F 9/4881* (2013.01); *G06F 9/4418* (2013.01); *G06F 9/461* (2013.01); *G06F 9/4831* (2013.01); *G06F 9/542* (2013.01)

(58) Field of Classification Search
CPC ..................................................... G06F 9/44
See application file for complete search history.

(56) References Cited

U.S. PATENT DOCUMENTS

| 9,742,903 | B1* | 8/2017 | Ferdman | ........... H04M 1/72569 |
| 2007/0217253 | A1 | 9/2007 | Kim et al. | |
| 2009/0172439 | A1 | 7/2009 | Cooper et al. | |
| 2011/0074596 | A1* | 3/2011 | Frohlick | ................. H04W 4/90 |
| | | | | 340/691.1 |
| 2013/0231857 | A1* | 9/2013 | Beaurepaire | ........... G01C 21/20 |
| | | | | 701/428 |

(Continued)

FOREIGN PATENT DOCUMENTS

| JP | H09319597 A | 12/1997 |
| JP | H11259162 A | 9/1999 |
| JP | 2012203449 A | 10/2012 |

(Continued)

*Primary Examiner* — Jae U Jeon

(57) ABSTRACT

An electronic device and a method for resuming a phased platform process in the electronic device includes switching a display that is included in the electronic device from an active state to a sleep state, detecting at least one event which internally occurs in the electronic device or is caused by an external device or a user in the case where the display is in the sleep state, executing a system process if the at least one event is detected, selecting one or more non-system processes related to one or more hardware or software components of the electronic device, respectively, on the basis of at least a part of the detected event, and executing the one or more selected non-system processes by activating the one or more hardware or software components of the electronic device that are related to the one or more selected non-system processes.

12 Claims, 13 Drawing Sheets

(56) References Cited

U.S. PATENT DOCUMENTS

2015/0154279 A1* 6/2015 Kim .................... G06F 16/9024
707/738

FOREIGN PATENT DOCUMENTS

| KR | 1019970016889 A | 4/1997 |
| KR | 1020050040498 A | 5/2005 |
| KR | 1020070094104 A | 9/2007 |
| KR | 1020100041518 A | 4/2010 |
| KR | 1020100098667 A | 9/2010 |

* cited by examiner

FIG. 5A

| PROCESS CATEGORY | CHARACTERISTICS |
|---|---|
| SYSTEM PROCESS | PRIMARY PROCESS TO MANAGE SYSTEM OPERATION |
| GRAPHIC PROCESS | PROCESS REQUIRED FOR SCREEN UPDATE OF USER INTERFACE (UI) APPLICATION |
| NETWORK PROCESS | PROCESS REQUIRED TO TRANSMIT/ RECEIVE DATA FROM NETWORK |
| MEDIA PROCESS | PROCESS REQUIRED TO OUTPUT VIDEO AND AUDIO |
| LOG PROCESS | PROCESS TO COLLECT LOG DATA OF DEVICE |
| SENSOR PROCESS | PROCESS TO PARTICIPATE IN VARIOUS KINDS OF SENSOR OPERATIONS (GPS, ILLUMINATION SENSOR, PROXIMITY SENSOR, AND HEALTH CARE SENSOR, AND SO ON) |
| CONNECTION PROCESS | PROCESS TO COMMUNICATE WITH EXTERNAL DEVICE (BLUETOOTH, NFC, OR WIFI) |
| SERVICE PROCESS | PROCESS RELATED TO APPLICATION THAT DOES NOT INCLUDE UI |
| UI PROCESS | PROCESS RELATED TO APPLICATION THAT INCLUDES UI |

FIG. 5B

| GROUP | EVENT | RESUMPTION PRIORITY | TARGET PROCESS CATEGORY |
|---|---|---|---|
| FIRST GROUP | OPERATION RESUMPTION | HIGH | SYSTEM PROCESS |
| SECOND GROUP | DISPLAY TURNED ON | MIDDLE | GRAPHIC PROCESS |
| THIRD GROUP | USER INPUT OCCURRENCE | LOW | UI PROCESS<br>LOG PROCESS<br>SERVICE PROCESS |
| VARIOUS GROUP | PROCESS RESUMPTION CAUSE SENSING | VARIABLE | NETWORK PROCESS<br>MEDIA PROCESS<br>SENSOR PROCESS<br>CONNECTION PROCESS |

FIG. 8A

| White List | Category Type | Daemon process name |
|---|---|---|
| 1 | System | System daemon |
| 2 | | Device daemon |
| 3 | | Resource daemon |
| 4 | | Communication daemon |
| 5 | Graphic | Window Manager daemon |
| 6 | | Display daemon |
| 7 | | Input daemon |
| 8 | Network | Telephony daemon |
| 9 | | Push daemon |
| 10 | | Modem interface daemon |
| 11 | Media | Audio daemon |
| 12 | | Sound server daemon |
| 13 | Log | Journal logging daemon |
| 14 | | Debug log daemon |
| 15 | Sensor | Sensor daemon |
| 16 | | Sensor Context daemon |
| 17 | Connectivity | Bluetooth daemon |
| 18 | | WIFI daemon |
| 19 | | Near Field Communication daemon |
| 20 | Service | message service daemon |
| 21 | | Email service daemon |

ELECTRONIC DEVICE AND METHOD FOR RESUMING PROCESS THEREOF

CROSS-REFERENCE TO RELATED APPLICATION AND CLAIM OF PRIORITY

The present application is related to and claims the benefit under 35 U.S.C. § 119(a) of a Korean patent application filed on Mar. 18, 2016, in the Korean Intellectual Property Office and assigned Serial No. 10-2016-0032767, the entire disclosure of which is hereby incorporated by reference.

TECHNICAL FIELD

The present disclosure relates to an electronic device and a method for managing processes that are executed in the electronic device.

BACKGROUND

Mobile and wearable devices that are represented by smart phones, tablet PCs, or smart watches, are driven using chargeable batteries due to their portable characteristics. Accordingly, it is an important factor in using such electronic devices how long the batteries can be used with their limited battery capacities.

According to a platform operation method in the related art, if an electronic device enters into an idle state, all applications and processes are made to be changed to a freeze state to block unnecessary scheduling, and then if the electronic device wakes up again through a specific event, all the applications and processes are made to be changed to an unfreeze state to enable the electronic device to perform a corresponding operation according to the specific event.

SUMMARY

However, according to the platform operation method as described above, even applications or processes, which are not persistently required to be executed according to the event that occurs in the electronic device, are collectively changed to the freeze/unfreeze state to cause unnecessary current consumption.

That is, if all the applications and processes are unconditionally changed to the unfreeze state at the same time although there exist various wakeup sources that can wake up the electronic device, unnecessary scheduling may occur. In particular, if a periodic resumption, which is not an action that is caused by an external event, such as a user input, or a simple network event occurs in the electronic device, the electronic device performs an operation according to the wakeup source without turning on a display, and then enters into an idle state again. However, in this case, since all processes that include a graphic process that is used to turn on the display are changed to an operable state, unnecessary current is consumed, and malfunction of the electronic device may be caused to occur.

To address the above-discussed deficiencies, it is a primary object to provide an electronic device may include a housing including an outline; a touch screen display configured to be exposed through the outline and located inside the housing; a wireless communication circuit located on an inside of the housing; at least one sensor configured to be exposed through the outline and located inside the housing; a processor located inside the housing to be electrically coupled to the touch screen display, the wireless communication circuit, and the at least one sensor; and a memory electrically coupled to the processor.

The memory, when executed, may store instructions to cause the processor to switch the display from an active state to a sleep state, to detect at least one event which internally occurs in the electronic device or is caused by an external device or a user in the case where the display is in the sleep state, to execute a system process if the at least one event is detected, to select one or more non-system processes related to one or more hardware or software components of the electronic device, respectively, on the basis of at least a part of the detected event, and to execute the one or more selected non-system processes by activating the one or more hardware or software components of the electronic device that are related to the one or more selected non-system processes.

According to an embodiment of the present disclosure, a method for resuming a phased platform process in an electronic device may include switching a display that is included in the electronic device from an active state to a sleep state; detecting at least one event which internally occurs in the electronic device or is caused by an external device or a user in the case where the display is in the sleep state; executing a system process if the at least one event is detected; selecting one or more non-system processes related to one or more hardware or software components of the electronic device, respectively, on the basis of at least a part of the detected event; and executing the one or more selected non-system processes by activating the one or more hardware or software components of the electronic device that are related to the one or more selected non-system processes.

According to the various embodiments of the present disclosure, a method is proposed, which permits processes to operate only in the case where scheduling is actually required by making groups of all the processes that are frozen in an idle state of the electronic device, and switching the processes to the unfreeze state in phases according to the event that is input to the electronic device and the state change of the platform. Accordingly, current consumption is reduced, and rapid reactivity can be provided with respect to the state change of the electronic device, such as turn-on of the display.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A to 5C are diagrams explaining a method for setting categories for classifying processes that are driven in an electronic device according to various embodiments;

FIGS. 8A and 8B are diagrams explaining a method for classifying daemon processes in a phased resumption system according to various embodiments;

DETAILED DESCRIPTION

Figure 1:
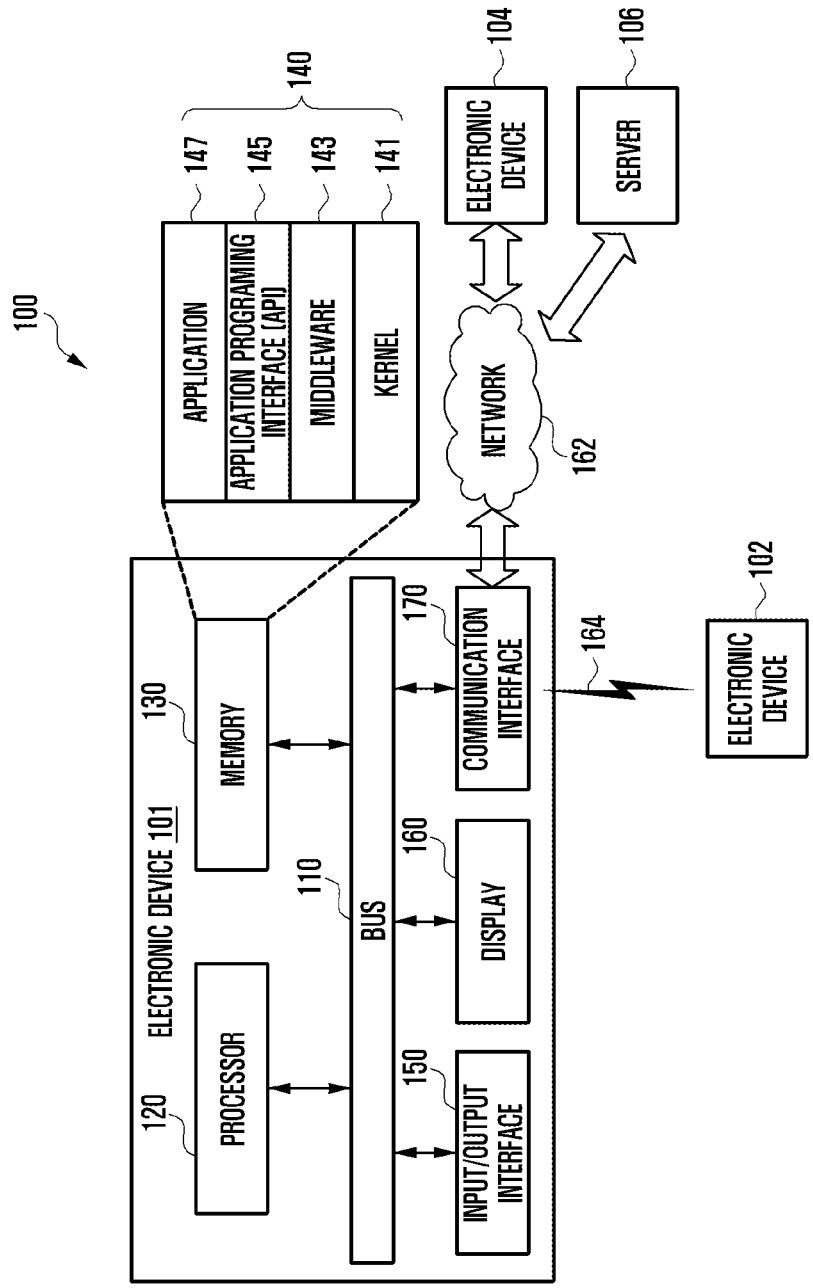
FIG. 1 is a diagram illustrating a network environment that includes an electronic device according to various embodiments.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, the present disclosure will be described with reference to the accompanying drawings. The present disclosure may have various embodiments, and modifications and changes may be made therein. Therefore, the present disclosure will be described in conjunction with particular embodiments shown in the accompanying drawings.

However, it should be understood that the present disclosure is not limited to the particular embodiments, but includes all modifications, equivalents, and/or alternatives within the spirit and scope of the present disclosure. In describing the drawings, similar reference numerals are used to designate similar elements.

In the present disclosure, the expression "include" or "may include" refers to existence of a corresponding function, operation, or element, and does not limit one or more additional functions, operations, or elements. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed there between.

In the present disclosure, the terms are used to describe specific embodiments, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to the present disclosure may be an electronic device including a display. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic accessory, an electronic tattoo, and a smart watch.

According to some embodiments, the electronic device may be a smart home appliance. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to various embodiments will be described with reference to the accompanying drawings. The term "user" used in various embodiments may refer to a person who uses an electronic device or a device (for example, an artificial intelligence electronic device) that uses an electronic device.

FIG. 1 illustrates a network environment including an electronic device according to various embodiments of the present disclosure.

Referring to FIG. 1, an electronic device 101, in a network environment 100, includes a bus 110, a processor 120, a memory 130, an input/output interface 150, a display 160, and a communication interface 170. According to some embodiment, the electronic device 101 can omit at least one of the components or further include another component.

The bus 110 can be a circuit connecting the above described components and transmitting communication (e.g., a control message) between the above described components.

The processor 120 can include one or more of central processing unit (CPU), application processor (AP) or communication processor (CP). For example, the processor 120 can control at least one component of the electronic device 101 and/or execute calculation relating to communication or data processing.

The memory 130 can include volatile and/or non-volatile memory. For example, the memory 130 can store command or data relating to at least one component of the electronic device 101. According to some embodiment, the memory can store software and/or program 140. For example, the program 140 can include a kernel 141, middleware 143, an application programming interface (API) 145, and/or an application 147 and so on. At least one portion of the kernel 141, the middleware 143 and the API 145 can be defined as operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 can be used, to the application 147.

The API 145 is an interface by which the application 147 can control a function provided by the kernel 141 or the middleware 142 and includes, for example, at least one interface or function (e.g., command) for a file control, a window control, image processing, or a character control.

The input/output interface 150 can be interface to transmit command or data inputted by a user or another external device to another component(s) of the electronic device 101. Further, the input/output interface 150 can output the command or data received from the another component(s) of the electronic device 101 to the user or the another external device.

The display 160 can include, for example, liquid crystal display (LCD), light emitting diode (LED), organic LED (OLED), or micro electro mechanical system (MEMS) display, or electronic paper display. The display 160 can display, for example, various contents (text, image, video, icon, or symbol, and so on) to a user. The display 160 can include a touch screen, and receive touch, gesture, approaching, or hovering input using a part of body of the user.

The communication interface 170 can set communication of the electronic device 101 and external device (e.g., a first external device 102, a second external device 104, or a server 106). For example, the communication interface 170 can be connected with the network 162 through wireless communication or wire communication and communicate with the external device (e.g., a second external device 104 or server 106).

Wireless communication can use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 164 can include, for example, at least one of Wi-Fi, Bluetooth, Near Field Communication (NFC), Magnetic Secure Transmission or near field Magnetic data Stripe Transmission (MST), and Global Navigation Satellite System (GNSS), and the like.

The GNSS can include at least one of, for example, a Global Positioning System (GPS), a Global navigation satellite system (Glonass), a Beidou Navigation Satellite System (hereinafter, referred to as "Beidou"), and Galileo (European global satellite-based navigation system). Hereinafter, the "GPS" can be interchangeably used with the "GNSS" in the present disclosure. Wired communication can include, for example, at least one of USB (universal serial bus), HDMI (high definition multimedia interface), RS-232 (recommended standard-232), POTS (plain old telephone service), and the like. The network 162 can include telecommunication network, for example, at least one of a computer network (e.g., LAN or WAN), internet, and a telephone network.

Each of the first external device 102 and the second external device 104 can be same type or different type of device with the electronic device 101. According to some embodiment, the server 106 can include one or more group of servers. According to various embodiments, at least one portion of executions executed by the electronic device can be performed by one or more electronic devices (e.g., external electronic device 102, 104, or server 106). According to some embodiments, when the electronic device 101 should perform a function or service automatically, the electronic device 101 can request performing of at least one function to the another device (e.g., external electronic device 102, 104, or server 106). For the above, cloud computing technology, distributed computing technology, or client-server computing technology can be used, for example.

Figure 2:
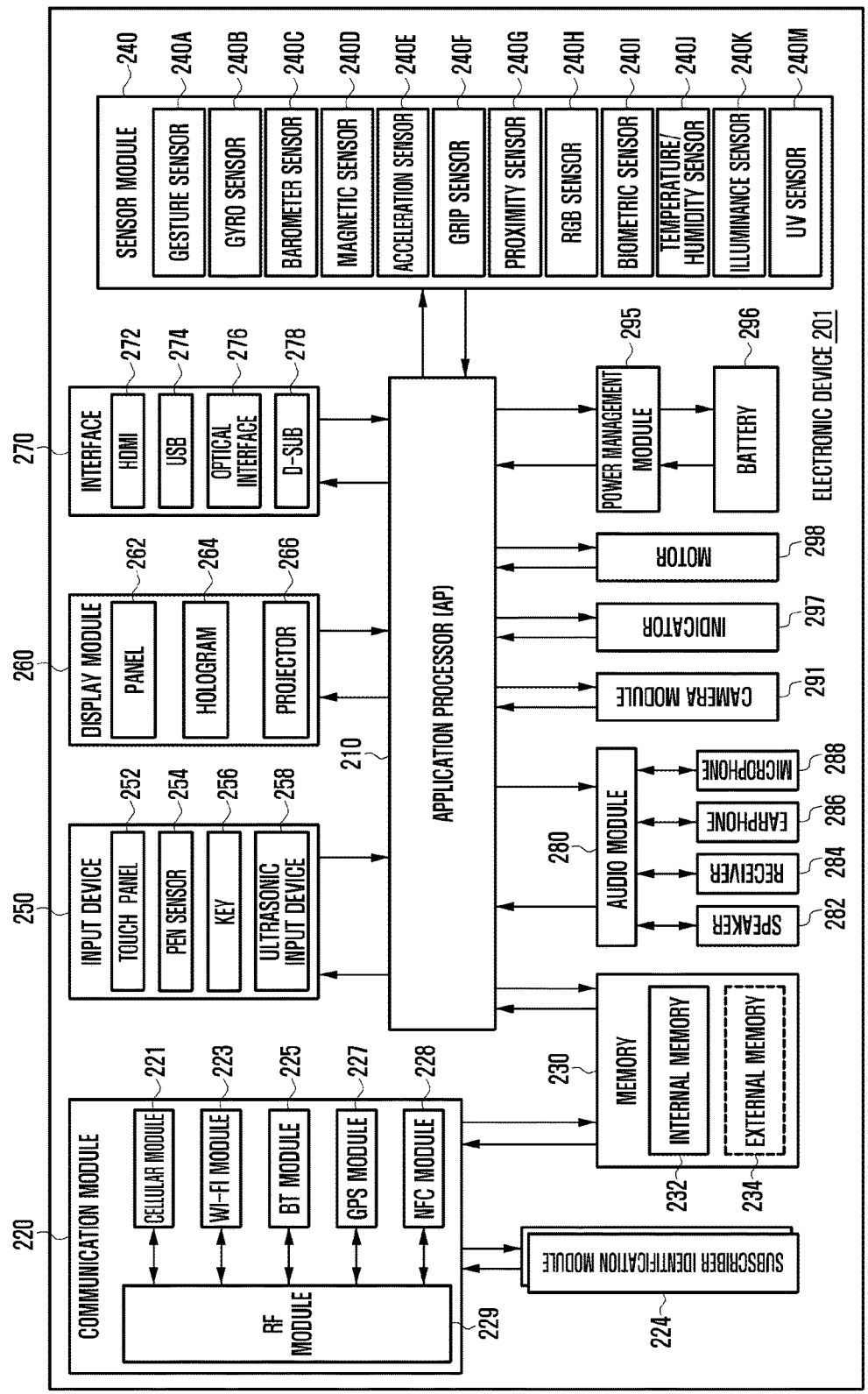
FIG. 2 is a block diagram of an electronic device according to various embodiments.

FIG. 2 illustrates a block diagram of an electronic device according to an embodiment of the present disclosure.

Referring to FIG. 2, an electronic device 201 can configure, for example, a whole or a part of the electronic device 101 illustrated in FIG. 1. The electronic device 201 includes one or more APs 210, a communication module 220, a subscriber identification module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an OS or an application program so as to control a plurality of hardware or software component elements connected to the AP 210 and execute various data processing and calculations including multimedia data. The AP 210 can be implemented by, for example, a system on chip (SoC). According to an embodiment, the processor 210 can further include a graphics processing unit (GPU) and/or image signal processor. The AP 210 can include at least one portion of components illustrated in FIG. 2 (e.g., a cellular module 221). The AP 210 can load command or data received from at least one of another component (e.g., non-volatile memory), store various data in the non-volatile memory.

The communication module 220 can include same or similar components with the communication interface 170 of FIG. 1. The communication module 220, for, example, can include the cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an internet service through a communication network (e.g., LTE, LTE-A, CDMA, WCDMA, UMTS, WiBro, GSM and the like). Further, the cellular module 221 can distinguish and authenticate electronic devices within a communication network by using a SIM (e.g., the SIM card 224). According to an embodiment, the cellular module 221 performs at least some of the functions which can be provided by the AP 210. For example, the cellular module 221 can perform at least some of the multimedia control functions. According to an embodiment, the cellular module 221 can include a CP.

Each of the Wi-Fi module 223, the BT module 225, the GPS module 227, and the NFC module 228 can include, for example, a processor for processing data transmitted/received through the corresponding module. Although the cellular module 221, the Wi-Fi module 223, the BT module 225, the GPS module 227, and the NFC module 228 are at least some (e.g., two or more) of the cellular module 221, the Wi-Fi module 223, the BT module 225, the GPS module 227, and the NFC module 228 can be included in one integrated chip (IC) or one IC package according to one embodiment. For example, at least some (e.g., the CP corresponding to the cellular module 221 and the Wi-Fi processor corresponding to the Wi-Fi module 223 of the processors corresponding to the cellular module 221, the Wi-Fi module 223, the BT module 225, the GPS module 227, and the NFC module 228 can be implemented by one SoC.

The RF module 229 transmits/receives data, for example, an RF signal. Although not illustrated, the RF module 229 can include, for example, a transceiver, a power amp module (PAM), a frequency filter, a low noise amplifier (LNA) and the like. Further, the RF module 229 can further include a component for transmitting/receiving electronic waves over a free air space in wireless communication, for example, a conductor, a conducting wire, and the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 can transmit/receive an RF signal through a separate RF module according to one embodiment.

The SIM card 224 is a card including a SIM and can be inserted into a slot formed in a particular portion of the electronic device. The SIM card 224 includes unique identification information (e.g., integrated circuit card identifier (ICCID)) or subscriber information (e.g., international mobile subscriber identity (IMSI).

The memory 230 (e.g., memory 130) can include an internal memory 232 or an external memory 234. The internal memory 232 can include, for example, at least one of a volatile memory (e.g., a random access memory (RAM), a dynamic RAM (DRAM), a static RAM (SRAM), a synchronous dynamic RAM (SDRAM), and the like), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like).

According to an embodiment, the internal memory 232 can be a solid state drive (SSD). The external memory 234 can further include a flash drive, for example, a compact flash (CF), a secure digital (SD), a micro-SD, a mini-SD, an extreme digital (xD), or a memory stick. The external memory 234 can be functionally connected to the electronic device 201 through various interfaces. According to an embodiment, the electronic device 201 can further include a storage device (or storage medium) such as a hard drive.

The sensor module 240 measures a physical quantity or detects an operation state of the electronic device 201, and converts the measured or detected information to an electronic signal. The sensor module 240 can include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 can include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 can further include a control circuit for controlling one or more sensors included in the sensor module 240.

The input device 250 includes a touch panel 252, a (digital) pen sensor 254, a key 256, and an ultrasonic input device 258. For example, the touch panel 252 can recognize a touch input in at least one type of a capacitive type, a resistive type, an infrared type, and an acoustic wave type. The touch panel 252 can further include a control circuit. In the capacitive type, the touch panel 252 can recognize proximity as well as a direct touch. The touch panel 252 can further include a tactile layer. In this event, the touch panel 252 provides a tactile reaction to the user.

The (digital) pen sensor 254 can be implemented, for example, using a method identical or similar to a method of receiving a touch input of the user, or using a separate recognition sheet. The key 256 can include, for example, a physical button, an optical key, or a key pad. The ultrasonic input device 258 is a device which can detect an acoustic wave by a microphone (e.g., a microphone 288) of the electronic device 201 through an input means generating an ultrasonic signal to identify data and can perform wireless recognition. According to an embodiment, the electronic device 201 receives a user input from an external device (e.g., computer or server) connected to the electronic device 201 by using the communication module 220.

The display 260 (e.g., display 160) includes a panel 262, a hologram device 264, and a projector 266. The panel 262 can be, for example, a LCD or an active matrix OLED (AM-OLED). The panel 262 can be implemented to be, for example, flexible, transparent, or wearable. The panel 262 can be configured by the touch panel 252 and one module. The hologram device 264 shows a stereoscopic image in the air by using interference of light. The projector 266 projects light on a screen to display an image. For example, the screen can be located inside or outside the electronic device 201. According to an embodiment, the display 260 can further include a control circuit for controlling the panel 262, the hologram device 264, and the projector 266.

According to an embodiment, the panel 262 can include a pressure sensor (or force sensor) that can measure the intensity of pressure that is caused by user's touch. The pressure sensor can be implemented in a body with the touch panel 252, or can be implemented by one or more sensors separately from the touch panel 252.

The interface 270 includes, for example, a HDMI 272, an USB 274, an optical interface 276, and a D-subminiature (D-sub) 278. The interface 270 can be included in, for example, the communication interface 170 illustrated in FIG. 1. Additionally or alternatively, the interface 270 can include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 can be included in, for example, the input/output interface 150 illustrated in FIG. 1. The audio module 280 processes sound information input or output through, for example, a speaker 282, a receiver 284, an earphone 286, the microphone 288 and the like.

The camera module 291 is a device which can photograph a still image and a video. According to an embodiment, the camera module 291 can include one or more image sensors (e.g., a front sensor or a back sensor), an image signal processor (ISP) (not shown) or a flash (e.g., an LED or xenon lamp).

The power managing module 295 manages power of the electronic device 201. Although not illustrated, the power managing module 295 can include, for example, a power management integrated circuit (PMIC), a charger IC, or a battery or fuel gauge.

The PMIC can be mounted to, for example, an integrated circuit or an SoC semiconductor. A charging method can be divided into wired and wireless methods. The charger IC charges a battery and prevent over voltage or over current from flowing from a charger. According to an embodiment, the charger IC includes a charger IC for at least one of the wired charging method and the wireless charging method.

The wireless charging method can include, for example, a magnetic resonance method, a magnetic induction method and an electromagnetic wave method, and additional circuits for wireless charging, for example, circuits such as a coil loop, a resonant circuit, a rectifier and the like can be added.

The battery fuel gauge measures, for example, a remaining quantity of the battery 296, or a voltage, a current, or a temperature during charging. The battery 296 can store or generate electricity and supply power to the electronic device 201 by using the stored or generated electricity. The battery 296 can include a rechargeable battery or a solar battery.

The indicator 297 shows particular statuses of the electronic device 201 or a part (e.g., AP 210) of the electronic device 201, for example, a booting status, a message status, a charging status and the like. The motor 298 converts an electrical signal to a mechanical vibration. Although not illustrated, the electronic device 201 can include a processing unit (e.g., GPU) for supporting a module TV. The processing unit for supporting the mobile TV can process, for example, media data according to a standard of digital multimedia broadcasting (DMB), digital video broadcasting (DVB), media flow and the like.

Each of the components of the electronic device according to various embodiments of the present disclosure can be implemented by one or more components and the name of the corresponding component can vary depending on a type of the electronic device. The electronic device according to various embodiments of the present disclosure can include at least one of the above described components, a few of the components can be omitted, or additional components can be further included. Also, some of the components of the electronic device according to various embodiments of the present disclosure can be combined to form a single entity, and thus can equivalently execute functions of the corresponding components before being combined.

Figure 3:
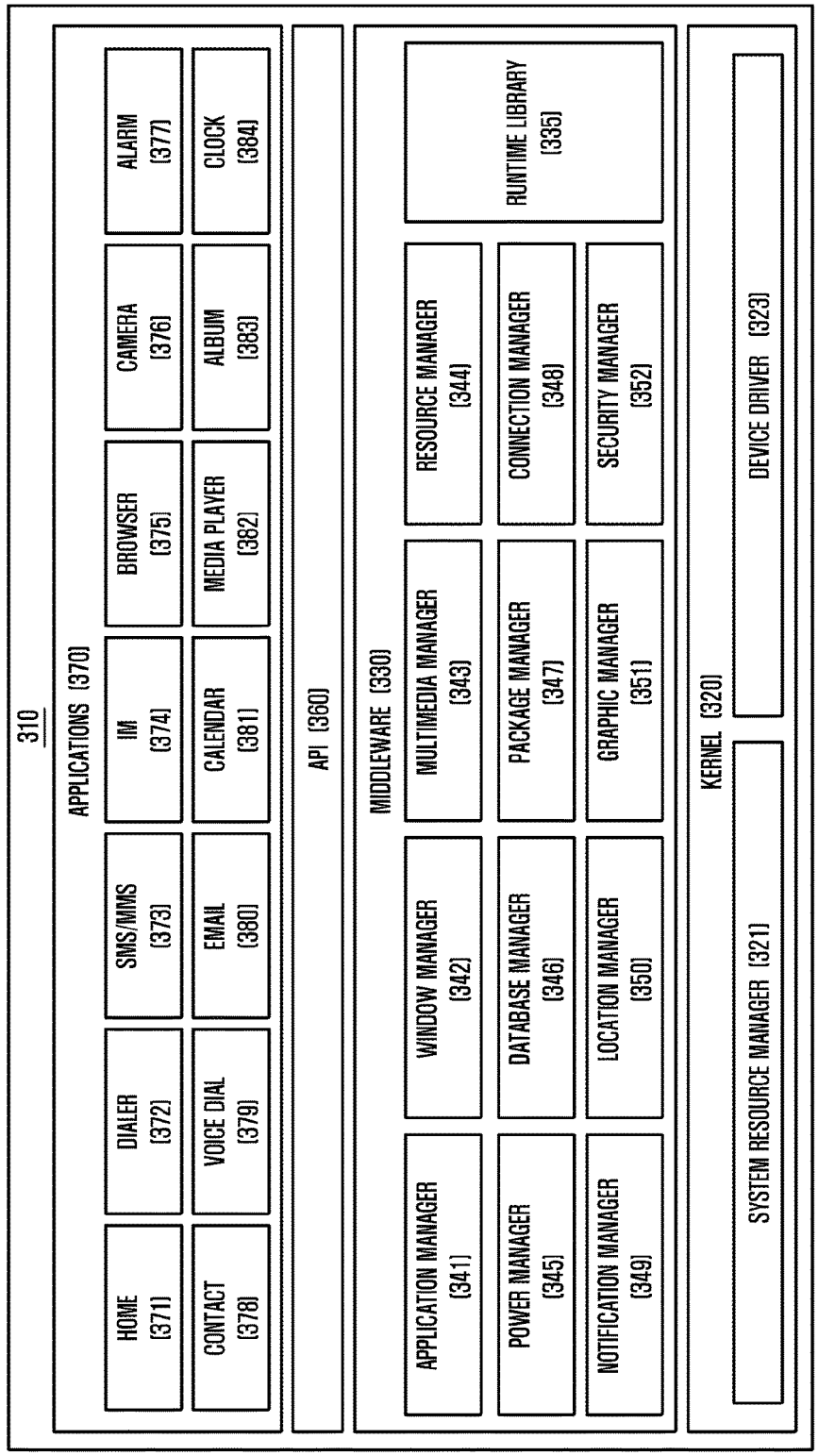
FIG. 3 is a block diagram of a program module according to various embodiments of the present disclosure.

FIG. 3 is a block diagram illustrating a programming module according to an embodiment of the present disclosure.

Referring to FIG. 3, a programming module 310 can be included, e.g. stored, in the electronic device 100, e.g. the memory 130, as illustrated in FIG. 1. At least a part of the programming module 310 (e.g., program 140) can be configured by software, firmware, hardware, and/or combinations of two or more thereof. The programming module 310 can include an OS that is implemented in hardware, e.g., the hardware 200 to control resources related to an electronic device, e.g., the electronic device 100, and/or various applications. e.g., applications 370, driven on the OS. For example, the OS can be Android, iOS, Windows, Symbian, Tizen, Bada, and the like. Referring to FIG. 3, the programming module 310 can include a kernel 320, middleware 330, an API 360, and the applications 370 (e.g., application 147). At least part of the program module 310 can be preloaded on the electronic device or downloaded from a server (e.g., an electronic device 102, 104, server 106, etc.).

The kernel 320, which can be like the kernel 141, can include a system resource manager 321 and/or a device driver 323. The system resource manager 321 can include, for example, a process manager, a memory manager, and a file system manager. The system resource manager 321 can control, allocate, and/or collect system resources. The device driver 323 can include, for example, a display driver, a camera driver, a BT driver, a shared memory driver, a USB driver, a keypad driver, a Wi-Fi driver, and an audio driver.

Further, according to an embodiment, the device driver 323 can include an inter-process communication (IPC) driver (not illustrated).

The middleware 330 can include a plurality of modules implemented in advance for providing functions commonly used by the applications 370. Further, the middleware 330 can provide the functions through the API 360 such that the applications 370 can efficiently use restricted system resources within the electronic apparatus. For example, as shown in FIG. 3, the middleware 330 can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352 and a payment manager 354.

The runtime library 335 can include a library module that a compiler uses in order to add a new function through a programming language while one of the applications 370 is being executed. According to an embodiment, the runtime library 335 can perform an input/output, memory management, and/or a function for an arithmetic function.

The application manager 341 can manage a life cycle of at least one of the applications 370. The window manager 342 can manage graphical user interface (GUI) resources used by a screen. The multimedia manager 343 can detect formats used for reproduction of various media files, and can perform encoding and/or decoding of a media file by using a codec suitable for the corresponding format. The resource manager 344 can manage resources such as a source code, a memory, and a storage space of at least one of the applications 370.

The power manager 345 can manage a battery and/or power, while operating together with a basic input/output system (BIOS), and can provide power information used for operation. The database manager 346 can manage generation, search, and/or change of a database to be used by at least one of the applications 370. The package manager 347 can manage installation and/or an update of an application distributed in a form of a package file.

For example, the connectivity manager 348 can manage wireless connectivity such as Wi-Fi or BT. The notification manager 349 can display and/or notify of an event, such as an arrival message, a promise, a proximity notification, and the like, in such a way that does not disturb a user. The location manager 350 can manage location information of an electronic apparatus. The graphic manager 351 can manage a graphic effect which will be provided to a user, and/or a user interface related to the graphic effect. The security manager 352 can provide all security functions used for system security and/or user authentication. According to an embodiment, when an electronic apparatus, e.g., the electronic apparatus 100, has a telephone call function, the middleware 330 can further include a telephony manager (not illustrated) for managing a voice and/or video communication function of the electronic apparatus. The payment manger 354 is capable of relaying payment information from the application 370 to an application 370 or a kernel 320. Alternatively, the payment manager 354 is capable of storing payment-related information received from an external device in the electronic device 200 or transmitting information stored in the electronic device 200 to an external device.

The middleware 330 can generate and use a new middleware module through various functional combinations of the aforementioned internal element modules. The middleware 330 can provide modules specialized according to types of OSs in order to provide differentiated functions. Further, the middleware 330 can dynamically remove some of the existing elements and/or add new elements. Accordingly, the middleware 330 can exclude some of the elements described in the various embodiments of the present disclosure, further include other elements, and/or substitute the elements with elements having a different name and performing a similar function.

The API 360, which can be similar to the API 133, is a set of API programming functions, and can be provided with a different configuration according to the OS. For example, in a case of Android or iOS, one API set can be provided for each of platforms, and in a case of Tizen, two or more API sets can be provided.

The applications 370, which can include an application similar to the application 147, can include, for example, a preloaded application and/or a third party application. The applications 370 can include one or more of the following: a home application 371 a dialer application 372, an SMS/multimedia messaging service (MMS) application 373, an instant messaging (IM) application 374, a browser application 375, a camera application 376, an alarm application 377, a contact application 378, a voice dial application 379, an email application 380, a calendar application 381, a media player application 382, an album application 383, a clock application 384, a payment application 385, a health care application (e.g., the measurement of blood pressure, exercise intensity, etc.), an application for providing environment information (e.g., atmospheric pressure, humidity, temperature, etc.), etc. However, the present embodiment is not limited thereto, and the applications 370 can include any other similar and/or suitable application.

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 can be called different names according to types of operating systems.

According to various embodiments, at least part of the program module 310 can be implemented with software, firmware, hardware, or any combination of two or more of them. At least part of the program module 310 can be implemented (e.g., executed) by a processor (e.g., processor 210). At least part of the programming module 310 can include modules, programs, routines, sets of instructions or processes, etc., in order to perform one or more functions.

In the present disclosure, the terminology 'module' refers to a 'unit' including hardware, software, firmware or a combination thereof. For example, the terminology 'module' is interchangeable with 'unit,' 'logic,' 'logical block,' 'component,' 'circuit,' or the like. A 'module' can be the smallest unit or a part of an integrated component. A 'module' can be the smallest unit or a part thereof that can perform one or more functions. A 'module' can be implemented in mechanical or electronic mode. For example, a 'module' can include at least one of the following: an application specific integrated circuit (ASIC) chip, field-programmable gate array (FPGAs) and a programmable-logic device that can perform functions that are known or will be developed.

At least part of the method (e.g., operations) or devices (e.g., modules or functions) according to various embodiments can be implemented with instructions that can be conducted via various types of computers and stored in computer-readable storage media, as types of programming modules, for example. One or more processors (e.g., processor 120) can execute command instructions, thereby performing the functions. An example of the computer-readable storage media can be memory 130.

Examples of computer-readable media include: magnetic media, such as hard disks, floppy disks, and magnetic media (e.g., magnetic tape); optical media such as Compact Disc Read Only Memory (CD-ROM) disks and Digital Versatile Disc (DVD); magneto-optical media, such as floptical disks; and hardware devices such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices can be configured to act as one or more software modules to perform the operations of various embodiments described above, or vice versa.

Modules or programming modules according to various embodiments can include one or more components, remove part of them described above, or further include new components. The operations performed by modules, programming modules, or other components, according to various embodiments, can be executed in serial, parallel, repetitive or heuristic fashion. Part of the operations can be executed in any other order, skipped, or executed with additional operations.

Hereinafter, an electronic device and a method for resuming a phased platform process in a platform of the electronic device according to various embodiments of the present disclosure will be described in detail.

According to various embodiments of the present disclosure, an electronic device can include a housing including an outline; a touch screen display configured to be exposed through the outline and located inside the housing; a wireless communication circuit located on an inside of the housing; at least one sensor configured to be exposed through the outline and located inside the housing; a processor located inside the housing to be electrically coupled to the touch screen display, the wireless communication circuit, and the at least one sensor; and a memory electrically coupled to the processor, wherein the memory stores an Operating System (OS) that includes a framework, and when executed, the memory stores instructions to cause the processor, using at least a part of the framework, to switch the display from an active state to a sleep state, to detect at least one event which internally occurs in the electronic device or is caused by an external device or a user in the case where the display is in the sleep state, to execute a system process if the at least one event is detected, to select one or more non-system processes related to one or more hardware or software components of the electronic device, respectively, on the basis of at least a part of the detected event, and to execute the one or more selected non-system processes by activating the one or more hardware or software components of the electronic device that are related to the one or more selected non-system processes.

In the electronic device according to various embodiments of the present disclosure, the memory, when executed, can further include instructions to cause the processor to switch the display to an active state.

In the electronic device according to various embodiments of the present disclosure, the selected non-system process can be related to the wireless communication circuit.

In the electronic device according to various embodiments of the present disclosure, the selected non-system process can be related to the at least one sensor.

In the electronic device according to various embodiments of the present disclosure, the memory, when executed, can further include instructions to cause the processor to determine functions of the one or more non-system processes, to generate a plurality of categories on the basis of the determined functions, and to classify the one or more non-system processes into at least one of the plurality of the generated categories.

In the electronic device according to various embodiments of the present disclosure, the memory, when executed, can further include instructions to cause the processor to give an execution resumption priority with respect to the at least one of the plurality of the generated categories.

In the electronic device according to various embodiments of the present disclosure, the execution resumption priority for the at least one category can be variable to correspond to the detected event.

In the electronic device according to various embodiments of the present disclosure, the memory, when executed, can further include instructions to cause the processor to successively execute the one or more non-system processes that are included in the category on the basis of the priority that is given to the at least one category.

In the electronic device according to various embodiments of the present disclosure, the memory, when executed, can further include instructions to cause the processor to freeze operations of the one or more selected non-system processes by inactivating the one or more activated hardware or software components if at least one event that is different from the detected event is not additionally detected for a predetermined time, after the at least one event is detected, to freeze an operation of the system process of the electronic device, and to temporarily stop a platform of the electronic device.

Figure 4:
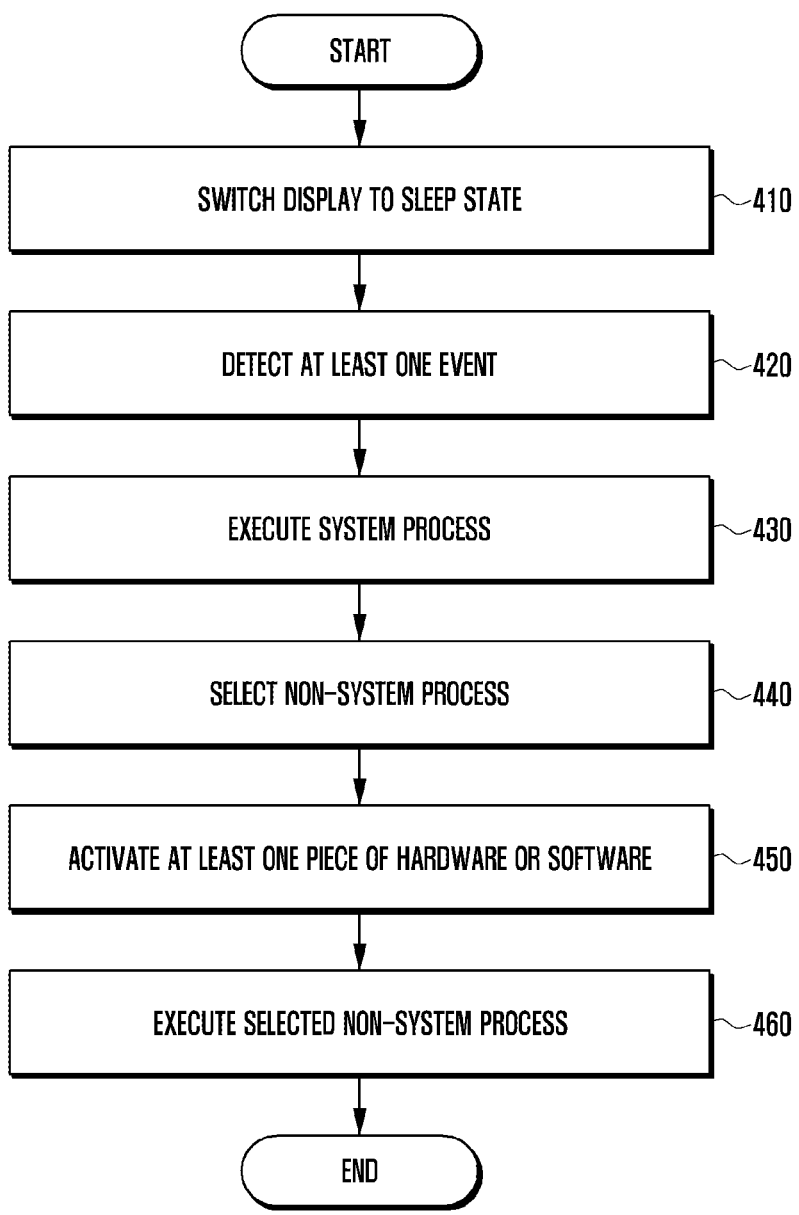
FIG. 4 is a flow chart explaining a method for resuming a phased platform process in an electronic device according to various embodiments.

FIG. 4 is a flow chart explaining a method for resuming a phased platform process in an electronic device according to various embodiments.

At operation 410, the electronic device can switch a display that is included in the electronic device from an active state to a sleep state. For example, if it is determined that a user does not use the electronic device that includes the display, the electronic device can operate in a standby mode, and can switch the display from the active state to the sleep state to correspond to the standby mode.

At operation 420, if the display is in the slip state, the electronic device can operate to detect at least one event which internally occurs in the electronic device or is caused by an external device or a user. According to an embodiment, even in the case where the display is in the slip state, the electronic device can receive data that corresponds to a specific event from at least one sensor that is provided in the electronic device. For example, the electronic device can receive data related to a motion of the electronic device.

According to another embodiment, the electronic device can receive a message through a wireless communication circuit that is included in the electronic device even in the case where the display is in the slip state. In order to perform an operation that corresponds to message reception, the electronic device can activate other components in the electronic device or can change the display to an active state. At operation 420, the electronic device can sense whether at least one event that includes the above-described embodiments has occurred.

At operation 430, the electronic device can execute a system process to correspond to the at least one event that is detected at operation 420. The system process can include a process that is to be essentially executed during driving of the electronic device. For example, all functions that are performed on the electronic device can be performed after the system process is executed.

At operation 440, the electronic device can select one or more non-system processes related to one or more hardware or software components of the electronic device, respectively, on the basis of at least a part of the detected event. According to an embodiment, the electronic device can operate to select the non-system on the basis of a part of a detected single event or partial events of a plurality of events. The non-system process can include all processes except for the system process among processes that can be executed in the electronic device. The non-system process can be related to activation of at least one hardware or software component in the electronic device. For example, a network process can be related to the activation of the wireless communication circuit that is provided in the electronic device.

At operation 450, the electronic device can execute the one or more selected non-system processes through activation of the one or more hardware or software components of the electronic device that are related to the one or more non-system processes that are selected at operation 440.

FIG. 5A is a diagram explaining a method for setting categories for classifying processes that are driven in an electronic device according to various embodiments.

According to an embodiment, in an electronic device that is disclosed in the description, one or more processes can be executed to correspond to an occurrence of a specific event. Further, a processor of the electronic device can set a plurality of categories to classify various processes that are driven in a platform of the electronic device according to a specific basis.

According to an embodiment, the plurality of categories can be set on the basis of functions of the respective processes. For example, the plurality of categories can be configured to include a system process, a graphic process, a network process, a media process, a log process, a sensor process, a connection process, a service process, and a User Interface (UI) process. The setting of the plurality of categories can be performed to correspond to user's setting.

According to an embodiment, the system process can mean a category that includes primary processes for managing the operation of the electronic device system. The graphic process can mean a category that includes processes that are required for a screen update of a User Interface (UI) application. The network process can mean a category that includes processes that are required to transmit/receive data to/from the network. The media process can mean a process that is required to output video and audio. The log process can mean a category that includes processes for collecting log data of the device. The sensor process can mean a category that includes processes that participate in the operations of various kinds of sensors. The various kinds of sensors can include a GPS sensor, an illumination sensor, a proximity sensor, and a health measurement sensor. The connection process can mean a category that includes processes that are used to communicate with an external device. The service process can mean a category that includes processes that are related to applications that do not include a UI. The UI process can mean a category that includes processes that are related to applications that include the UI.

For example, the processes which can be used to reproduce media content that is included in the electronic device can be included in the media process. A GPS sensor process that participates in the operation of the GPS sensor that is used to grasp the location of the electronic device and an illumination sensor process which participates in the operation of the illumination sensor that senses light input to the electronic device can be commonly included in the sensor process. Further, processes which participate in the control of devices (e.g., Bluetooth, NFC, and WIFI modules) that are used to enable the electronic device and an external device to communicate with each other.

FIG. 5A exemplifies a method for setting process categories according to the functions of the respective processes and a method for classifying the processes so that the processes can be included in at least one of the set process categories, and the basis to set a plurality of categories and a method for classifying the respective processes can be changed according to the settings.

FIG. 5B is a diagram explaining a method for setting groups for classifying processes that are driven in a platform of an electronic device according to various embodiments.

For example, a first group that is related to a platform operation resumption event can be grouped to include system process categories, and an operation resumption priority of the first group can be set to "high". Further, a second group that is related to a display operation event can be grouped to include graphic processes, and an operation resumption priority of the second group can be set to "middle". Further, a third group that is related to a user input event can be grouped to include a UI process category, a log process category, and a service process category, and an operation resumption priority of the third group can be set to "low".

In addition, the process categories, of which the priority is variable according to the detected event or received operation resumption cause, can be grouped into a variable group. For example, in the case of reproducing media that is stored in the memory of the electronic device, it is not required to drive the processes in the network process category that is related only to driving of the network device, whereas in the case where an event that is related to communication with an external device occurs, it is necessarily required to drive the processes that are included in the network process category. Accordingly, the priority of the processes that are included in the network process category can be variable.

Figure 5C:
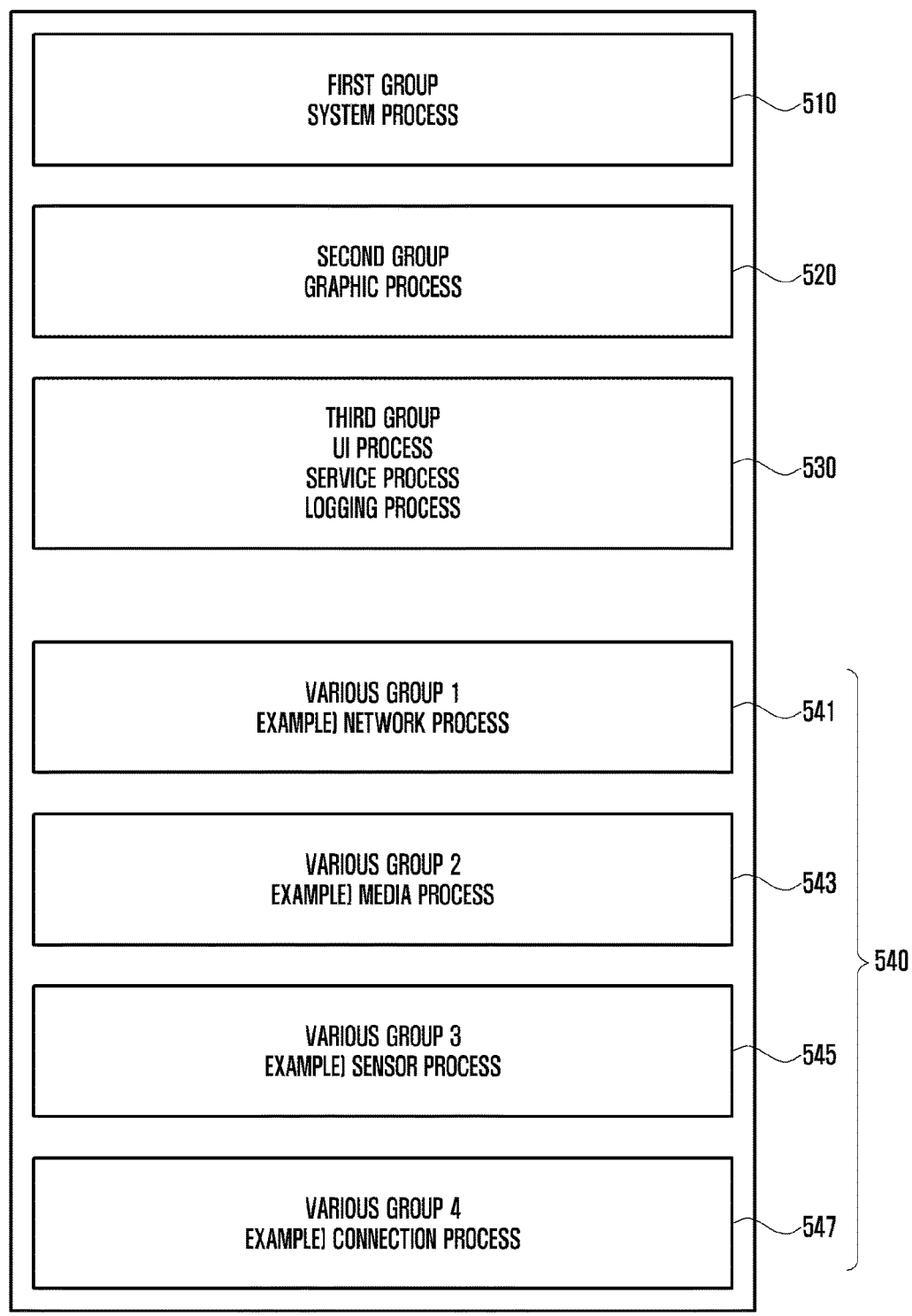

FIG. 5C is a diagram explaining a method for setting groups for classifying processes that are driven in a platform of an electronic device according to various embodiments.

According to an embodiment, groups that are disclosed in FIG. 5C can be configured to include at least one of process categories that are classified by functions. For example, if an operation resumption cause that is related to the operation of a GPS sensor provided in the electronic device is received in the electronic device, the control unit of the electronic device can determine the operation resumption of the electronic device. Further, the control unit can determine that the received operation resumption cause is related to the GPS sensor, and can determine whether to resume the operations of the device and the platform through reception of data that is related to successive performing of the device operation resumption and the platform operation resumption according to the predetermined basis related to the GPS device.

The operations after the platform operation resumption can be determined on the basis of information on the predetermined priority. For example, the operation resumption can be performed from the processes included in the first group 510 that corresponds to the "high" operation resumption priority. If the platform operation resumption is determined, the processes that are included in the system process category are changed to an unfreeze state, and thus it is not required to perform an operation that is related to the platform operation resumption. Accordingly, the processes included in the first group 510 can have the operation resumption priority that is higher than the operation resumption priority of processes included in other groups.

If the resumption of the processes that are included in the first group is completed, it becomes possible to determine whether to resume the operations of the processes of the graphic process category included in the second group that corresponds to the "middle" operation resumption priority. The control unit of the electronic device can determine whether the received GPS related operation resumption cause requests the operation of the display, and can determine whether to resume the operations of the processes included in the second group 520. The control unit can successively determine whether to resume the operations of the processes included in the respective groups on the basis of information on the fixed operation resumption priority as described above. Further, the control unit can determine the operation resumption priority for each variable group 540 that is changed to correspond to the received GPS related operation resumption cause, and can determine whether to resume the operations of the processes according to the determined result. According to the embodiment, since the process that performs the GPS related operation is set to be included in the sensor process category, the priority of the variable third group 545 that includes the sensor process category can be set to "high".

Figure 6:
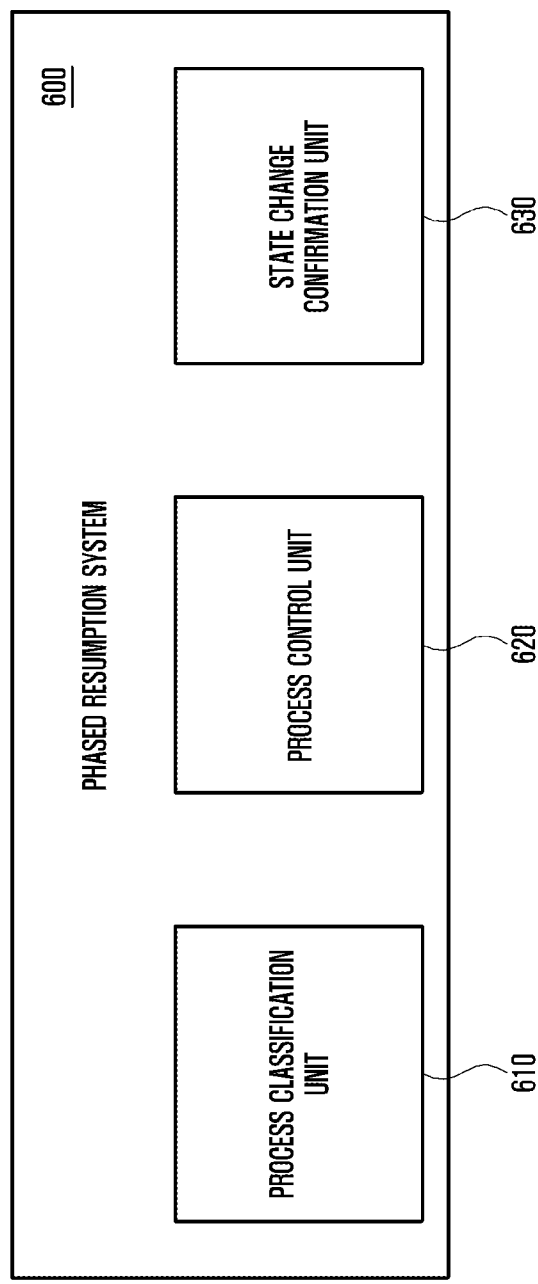
FIG. 6 is a diagram explaining components of a phased resumption system according to various embodiments.

FIG. 6 is a diagram explaining components of a phased resumption system according to various embodiments.

A phased resumption system 600 according to an embodiment can include a portion 610 for dividing and grouping characteristics of all processes that are currently operating, a portion 620 for determining whether to resume operations of an electronic device, a platform, and all processes, and a portion 630 for confirming state changes of the electronic device and the platform. The phased resumption system 600 can be expressed to substitute for the concept of the processor 210 that is disclosed in FIG. 2, or to mean parts of operations that are driven by the processor 210.

According to one of various embodiments of the present disclosure, the process classification unit 610 can determine the characteristics of all processes that are driven on the platform, and can perform classification according to a predetermined basis. The operation of grasping the characteristics of the respective processes and performing grouping according to a specific basis can be an operation that is required to be performed most preferentially in the phased resumption system 600. According to the classification basis, it becomes possible to determine the range of processes to be changed to an unfreeze state to correspond to the received operation resumption cause.

According to one of various embodiments of the present disclosure, the process classification unit 610 can analyze all the processes that operate in the platform. The determination of the characteristics of all the processes can be performed through a procedure of executing all the processes as described above during booting of the electronic device, and the characteristics or functions of the processes can be predetermined when the corresponding processes are produced or when the corresponding processes are registered (or installed) in the electronic device.

For example, in order to determine the characteristics or functions of the respective processes, the process classification unit 610 can analyze the characteristics of all the processes through successive execution of the corresponding processes to store the analyzed characteristics in the memory.

A method for classifying processes through the process classification unit 610 according to an embodiment can follow the functions or characteristics that are predefined in the respective processes, or can follow the functions of the respective processes that are determined and stored by the process classification unit 610. For example, processes that perform tasks related to the operation of the display can be classified into a graphic process category, and processes that perform tasks related to the resumption of the platform can be classified into a system processor category. That is, as disclosed in FIGS. 5A to 5C, at least one process can be classified according to a category classification basis for predetermined functions. The classification basis can be predetermined, and can be changed according to user's setting. For example, respective physical components that are provided in the electronic device can be set as the classification basis, and processes that are related to the operations of the respective components can be classified into one group.

A method for classifying processes through the process classification unit 610 according to an embodiment can determine operation resumption for respective operations that correspond to the received operation resumption causes at operations of determining whether to resume the device operation, the platform operation, and the process operation on the basis of the operation resumption causes that are received in the electronic device, and in particular, can confirm target processes that are required to be changed to an unfreeze state corresponding to the operation resumption causes at the operation of determining whether to resume the operations for the processes. It can be determined to give an operation resumption priority with respect to the confirmed target processes and to change the target processes to the unfreeze state in phases according to the priority, and the process categories having the same priority can be grouped and managed.

The above-described embodiments are merely disclosed for easy explanation of the functions of the process classification unit 610, and the classification basis or the grouping method can be changed in consideration of the purpose of the electronic device.

The process control unit 620 according to an embodiment can determine whether to resume operation resumption targets for respective operations through at least one operation resumption determination operation that can be generated from a time when the electronic device receives the device operation resumption cause to a time when the electronic device enters into a sleep state. For example, the process control unit 620 can determine whether to resume the operations of the device, the platform, and the respective processes at operations of determining whether to resume the device operation, the platform operation, and the process operation. For this, the process control unit 620 can analyze the operation resumption causes that can be input at respective operations, and can determine targets to be resumed at the corresponding operations on the basis of the analyzed operation resumption causes. That is, the process control unit 620 can manage whether to resume the operations of the electronic device, the platform, and the processes in phases according to respective phased resumption causes and events that occur in the device.

For example, if a device operation resumption cause occurs in the electronic device that is in a sleep state, the process control unit 620 according to an embodiment can determine whether to resume the operation of the electronic device to correspond to the resumption cause. If the operation of the electronic device is resumed, the process control unit 620 can determine whether to resume the operation of the platform of the electronic device on the basis of the occurring device operation resumption cause or another event. Here, the basis to determine whether to resume the operation of the electronic device and the basis to determine whether to resume the operation of the platform can follow a predetermined basis. When the resumption of the operation of the platform is determined, the process that is included in the system process category for performing a task related to the platform operation resumption among the processes that are driven on the platform can be changed to a unfreeze state. The process control unit 620 can determine whether there is a process category that is required to be additionally changed to the unfreeze state.

At an operation where the process control unit 620 according to an embodiment can determine whether to drive at least one of several processes that are driven on the platform, the operation of determining whether to drive the at least one process can be performed based on the classification basis that is grouped by the process classification unit 610 according to the operation resumption priority. For example, the process classification unit 610 can perform grouping so that the system process category is included in the first group that is related to the operation resumption event of the platform, and can set the operation resumption priority of the first group to "high". In this case, the process control unit 620 can collectively determine whether to resume the operations of the processes in the unit of a group. That is, according to the priority that is set for the group as described above, the process control unit 620 can preferentially change the processes of the first group to an unfreeze state in comparison to the processes of other groups.

The state change confirmation unit 630 according to an embodiment can sense or confirm the change of the electronic device and/or the platform. Further, the state change confirmation unit 630 can serve to provide information on what process is to be first changed to an unfreeze state through determination of whether an event that is related to the operation of the display has occurred and whether a user input has occurred. For example, if the device operation resumption cause (e.g., button input, wheel rotation, specific event sensing through a sensor, or data communication) is received, the state change confirmation unit 630 can determine whether there is a process that is required to be changed to the unfreeze state to correspond to the operation resumption cause. If a plurality of processes exist as the result of the determination, the state change confirmation unit 630 can determine the order in which the plurality of processors are changed to the unfreeze state in consideration of the priority between the plurality of processes. According to an embodiment, if the device operation resumption cause that is related to the data communication is received, the state change confirmation unit 630 can determine whether it is required to change the processes that are included in the network process category to the unfreeze state.

Figure 7:
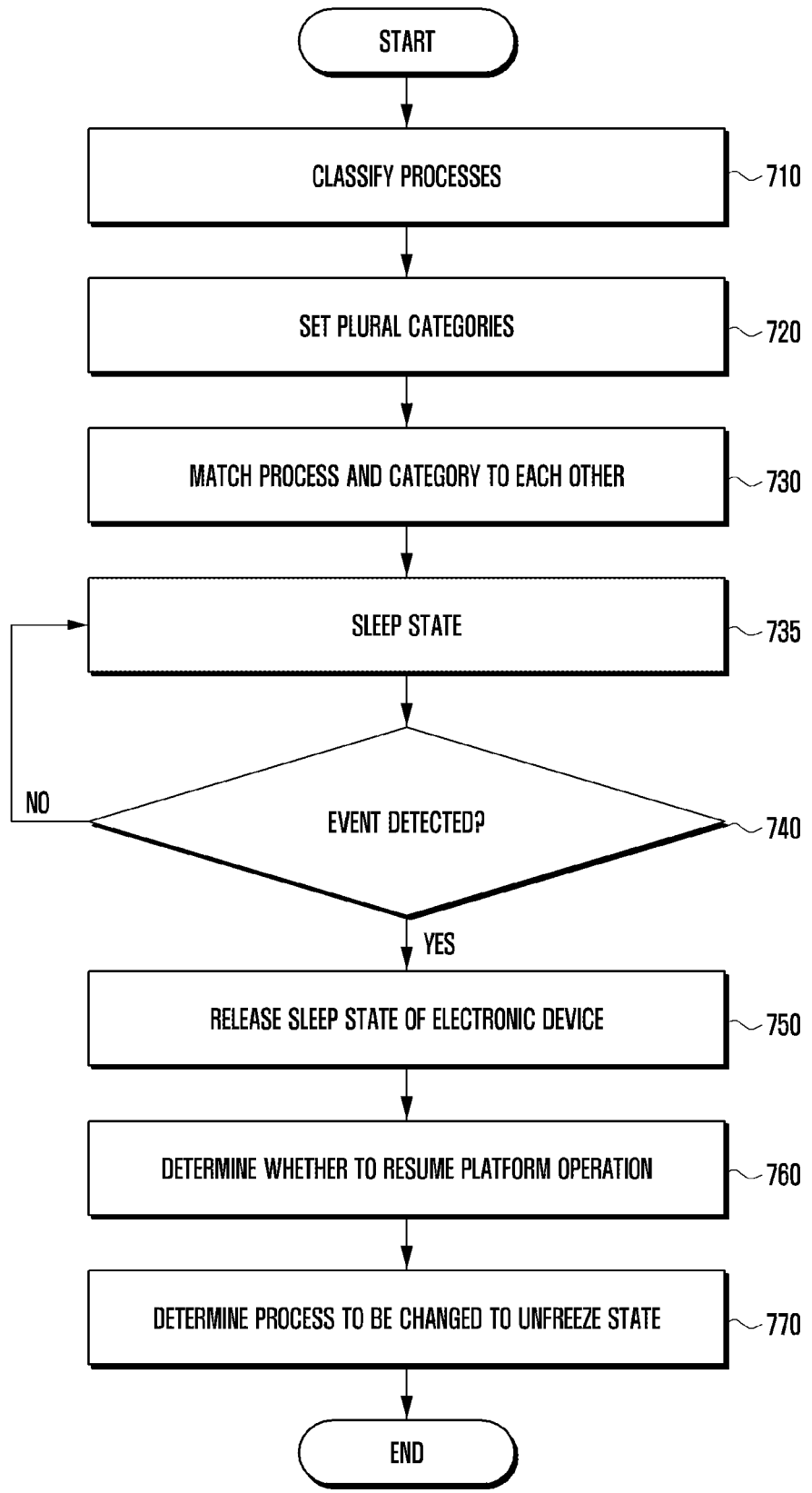
FIG. 7 is a flowchart explaining a method for resuming a phased platform process in an electronic device according to various embodiments.

FIG. 7 is a flowchart explaining a method for resuming a phased platform process in an electronic device according to various embodiments.

The electronic device according to an embodiment of the present disclosure can be configured to include the components as illustrated in FIG. 2.

At operation 710, the processor 210 of the electronic device 201 as illustrated in FIG. 2 can classify various processes that are executed in the platform of the electronic device according to a specific basis. In the electronic device, various processes can be executed, and the various processes can be classified according to user's setting. For example, one or more processes can be classified in the form in which only processes that perform similar functions are gathered on the basis of functions of the respective processes.

At operation 720, the electronic device can set a plurality of categories that are related to the processes that are executed in the electronic device. The plurality of categories can be set on the basis of functions of the respective processes. For example, the plurality of categories can be configured to include a system process, a graphic process, a network process, a media process, a log process, a sensor process, a connection process, a service process, and a User Interface (UI) process. The setting of the plurality of categories can be performed to correspond to the user's setting.

At operation 730, at least one process can be configured to be included in at least one of the plurality of categories on the basis of the plurality of categories that are set at operation 720.

As described above, an operation of classifying the processes, an operation of setting a plurality of categories to divide the processes, and an operation of matching the classified process to at least one of the plurality of the set categories can be performed during booting of the electronic device, or can be performed with respect to all the processes that are currently operating before the electronic device that has performed an operation according to a specific event is changed to a sleep state. Further, the above-described operations can be performed just after the electronic device that is in a sleep state wakes up through reception of the operation resumption cause. If performing of operations 710 to 730 is completed, the electronic device can be in a sleep state as at operation 735. The sleep state can means a state in which the electronic device waits for reception of an internal event or an external input.

At operation 740, the electronic device can determine whether at least one event or a device operation resumption cause, which can internally occur in the electronic device or which can be caused by an external device or a user, is detected. The at least one event and the device operation resumption cause can diversely occur. For example, the electronic device according to an embodiment can receive a user input from an input device (e.g., 250 in FIG. 2) that is provided in the electronic device, or can receive an input signal from an external device through the communication module (220 of FIG. 2). Further, the location change of the electronic device that can be sensed through the sensor module (e.g., 240 in FIG. 2) that is provided in the electronic device or various gestures, such as movement of the electronic device, can be set as the device operation resumption causes.

At operation 750, the sleep state of the electronic device can be released to correspond to the various resumption causes as described above or an event, and the operation of the electronic device can be resumed. The operation resumption causes can be predetermined, and can be changed, added, or deleted according to user's setting.

At operation 760, whether to resume the operation of the platform can be determined to correspond to the detected event or the received device operation resumption cause. The phased resumption system according to an embodiment can release the sleep state of the electronic device as at operation 750 if a device operation occurrence cause is sensed. In this case, it is possible to determine whether to resume the platform most preferentially without changing all the processes to a unfreeze state. If the platform resumption is unnecessary according to the resumption cause, it is also unnecessary to change the process that is driven on the platform to the unfreeze state, and thus it is not required for the electronic device that has resumed the operation to perform an additional operation. Accordingly, the electronic device can immediately enter into the sleep state to prevent unnecessary scheduling from being performed.

According to the embodiment as described above, if the device operation resumption cause is input, the electronic device is resumed, and if an additional operation resumption cause occurs simultaneously, the electronic device can determine whether to resume the operation of the platform. The device operation resumption cause can occur singly, or various operation resumption causes can occur simultaneously. In this case, the cause of initial resumption of the electronic device can differ from the operation resumption cause that has determined the resumption of the operation of the platform.

According to an embodiment of the present disclosure, if the resumption of the platform is required according to the operation resumption cause that is received in the electronic device, the resumption system can change only parts of all processes that are driven on the platform to the unfreeze state according to a predetermined basis. For example, if the process that is required to perform an operation according to the operation resumption cause is only the system process, the resumption system can prevent even unnecessary processes from being changed to the unfreeze state in all, and can process an input event using only the unfreezing system process. If the resumption of the platform is determined, the phased resumption system according to an embodiment can set to change the system process to the unfreeze state. For example, the platform operation resumption and the system process execution can be simultaneously performed, and can be expressed to mean the same operations.

At operation 770, if the resumption of the platform is determined to correspond to the operation resumption cause, it can be determined if there is a process that requires the operation resumption on the platform in addition to the system process. For example, the process that additionally requires the change to the unfreeze state can be determined through determination of whether the platform is additionally resumed by the cause, such as a network, sensor, media, or external connection device. If there is an additional process that requires to be changed to the unfreeze state, only the additional process can be selected and changed to the unfreeze state, and thus the operation resumption of the unnecessary process can be prevented.

For example, if the initially input operation resumption cause is an event that requires to operate the display through transmission of a message from a network, a graphic related process that performs a task related to the operation of the display and a network related process that performs a task related to message reception can be additionally resumed, and processes related to a sensor, media, and external connection can still maintain the unfreeze state. The electronic device according to an embodiment can wait for reception of an additional user input, such as an input through a button or a touch input through a touch panel in a state where the display is turned on as described above, and if the user input as described above is not received until a predetermined time elapses, the electronic device can change the platform again to the sleep state, and can also change the processes, which are currently changed to the unfreeze state, to the unfreeze state to end the phased resumption system.

The above-described embodiments have been described as examples for easy understanding of the operation of the phased resumption system that is disclosed in the description, but are not intended to limit the operation of the phased resumption system to the above embodiments.

FIG. 8A is a diagram explaining a method for classifying daemon processes in a phased resumption system according to various embodiments.

Daemon processes mean processes that may not be ended while the system is alive, and can exist in a background process state. For example, a web server daemon can wait for a request from a client in a background state, and if the request arrives, the web server daemon can perform a service for the request through generation of a new process with respect to each request, and end the newly generated process.

According to an embodiment, the phased resumption system can discriminate the characteristic of the daemon process on the basis of a predefined white list of daemon processes. Further, when a plurality of daemon processes are executed together with system booting, the phased resumption system can classify the daemon processes in a predefined category type through comparison thereof with the white list.

According to an embodiment, a system daemon, a device daemon, a resource daemon, and/or a communication daemon can be classified into a system category type.

According to an embodiment, a window manager daemon, a display daemon, and/or an input daemon can be classified into e graphic category type.

According to an embodiment, a telephony daemon, a push daemon, and/or a modem interface daemon can be classified into a network category type.

According to an embodiment, an audio daemon and/or a sound server daemon can be classified into a media category type.

According to an embodiment, a journal logging daemon and/or debug log daemon can be classified into a log category type.

According to an embodiment, a sensor daemon and/or a sensor context daemon can be classified into a sensor category type.

According to an embodiment, a Bluetooth daemon, a WIFI daemon, and/or a Near Field Communication (NFC) daemon can be classified into a connectivity category type.

According to an embodiment, a message service daemon and/or an email service daemon can be classified into a service category type.

As described above, the white list that is disclosed in FIG. 8A can be merely one of various embodiments that are presented to explaining a method for determining a category type of the daemon processes, and the category type can be differently expressed according to the number and the kind of the daemon processors.

Figure 8B:
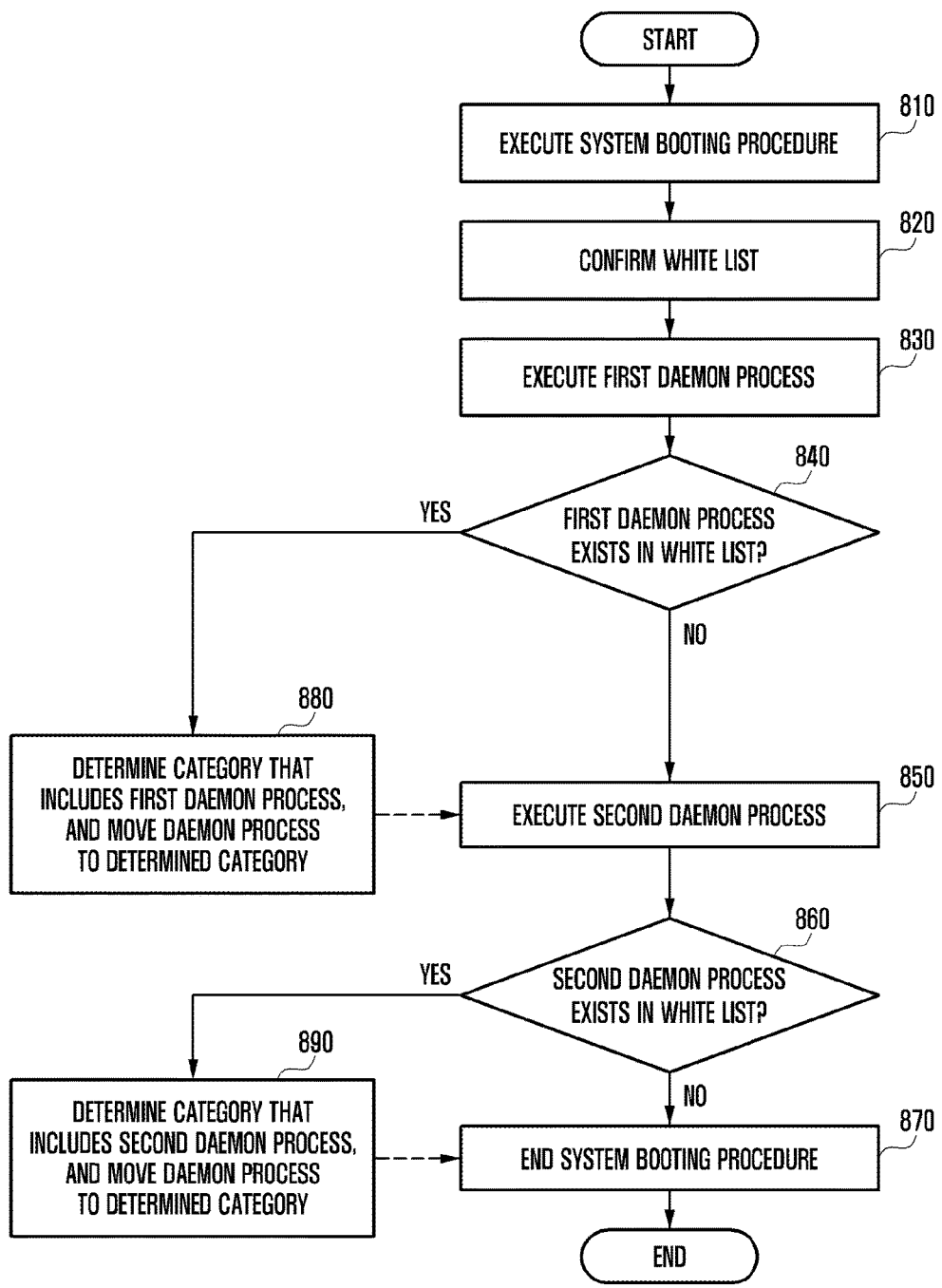

FIG. 8B is a diagram explaining a method for classifying daemon processes in a phased resumption system according to various embodiments.

At operation 810, a system booting procedure is executed, and at operation 820, the white list can be confirmed in the system booting procedure being executed. At operation 830, a first daemon process that corresponds to the confirmed white list can be executed.

At operation 840, it can be determined whether the first daemon process exists in the white list through comparison of the executed first daemon process with the predetermined white list. If the first daemon process exists in the white list as the result of the comparison, at operation 880, the category type that corresponds to the first daemon process can be determined, and the daemon process can be moved to the determined category. For example, if the first daemon process is the system daemon, the category type can be determined to correspond to the system category type through searching for the category type that corresponds to the system daemon in the white list. The system daemon can be moved to the group according to the determined category type, and the first daemon process can be classified into the predetermined category type.

At operation 840, if it is determined that the first daemon process does not exist in the white list, the classification of the category type for the first daemon process can be ended, and a next second daemon process can be executed.

At operation 850, if the second daemon process is executed, the phased resumption system can determine whether the second daemon process exists in the white list at operation 860. If the second daemon process exists in the white list, the phased resumption system, at operation 890, can determine the category that includes the second daemon process, and can move the daemon process to the determined category. For example, if the second daemon process is an audio daemon, the corresponding category type is a media category type, and thus the audio daemon can be moved to a group that corresponds to the media category type. In this case, the second daemon process can be classified into a predetermined category type.

At operation 860, if it is determined that the second daemon process does not exist in the white list, the classi-fication of the category type for the second daemon process can be ended, and the system booting procedure can be ended at operation 870.

In this embodiment, it is described that the second daemon process exists as the last daemon process, but the existence of daemon process is not limited thereto. The above-described procedure can be extended according to the number of daemon processes. Accordingly, if n daemon processes exist, the n-th category type classification operation can be maximally performed in the above-described system booting procedure.

Figure 9:
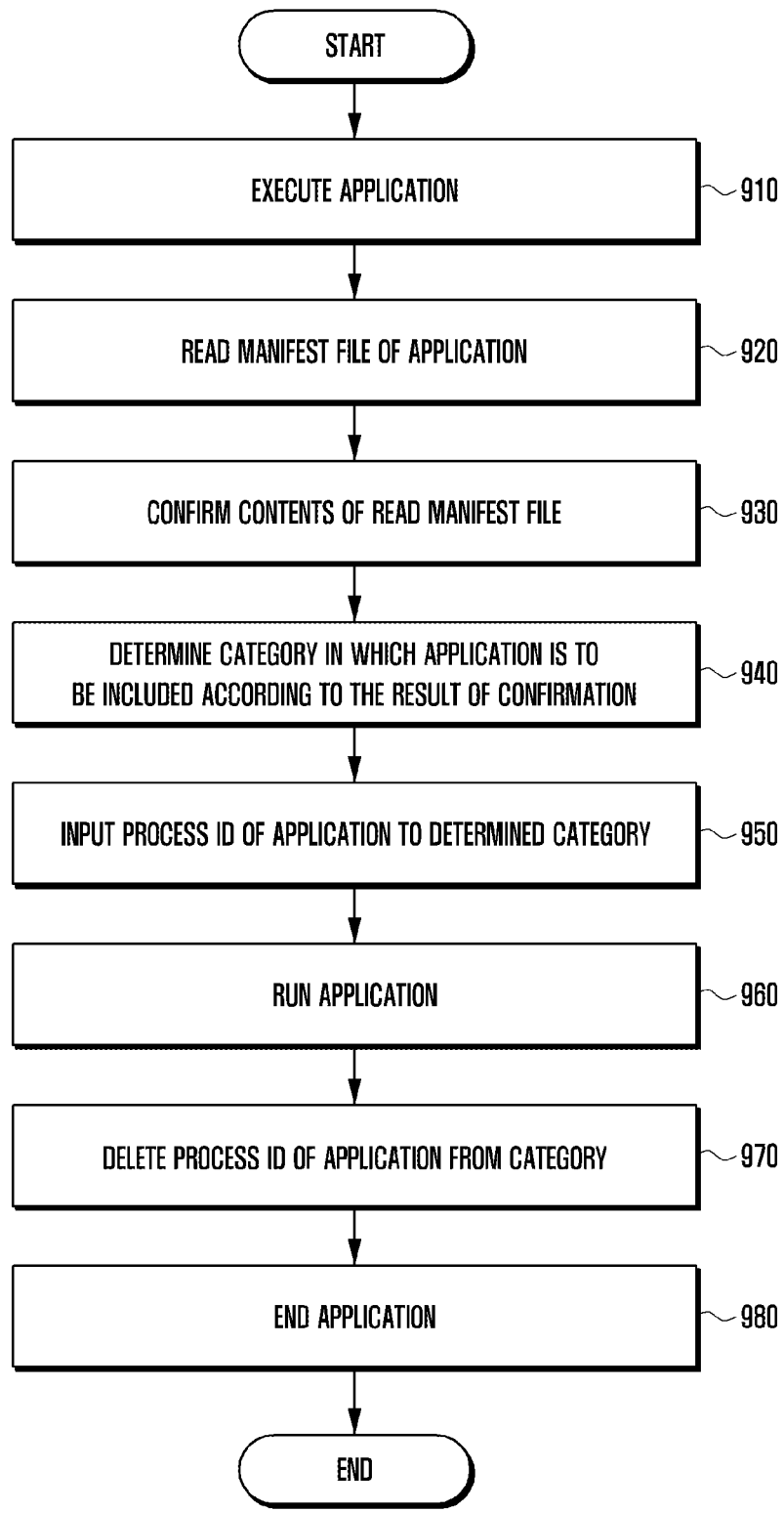
FIG. 9 is a flowchart explaining a method for classifying applications in a phased resumption system according to various embodiments.

FIG. 9 is a flowchart explaining a method for classifying applications in a phased resumption system according to various embodiments.

If an application is executed by a user at operation 910 of the phased resumption system according to an embodiment, the phased resumption system can read the following manifest file from data that is included in the application or is acquired from an app store at operation 920.

```
<?xml version="1.0" encoding="UTF-8" standalone="no"?>
<manifest xmlns="http://tizen.org/ns/packages" api-version="2.3"
package="org.example.basicuiapplication" version="1.0.0">
<profile name="mobile"/>
<ui-application appid="org.example.basicuiapplication"
exec="basicuiapplication"
multiple="false" taskmanage="true" type="capp">
<label>basicui</label>
<icon>org.example.basicuiapplication.png</icon>
<background-category value="media"/>
<background-category value="sensor"/>
</ui-application>
</manifest>
```

The manifest file means a file that describes all components that are loaded on the application. The components that constitute the corresponding application can be declared through the manifest file.

For example, it can be determined that a description portion "<background-category value="media"/> and <background-category value="sensor"/>" among the contents disclosed in Table 1 declares a category in which the application is to be included. That is, the application that includes the manifest file according to Table 1 can be included in the media category and the sensor category.

At operation 930, the contents of the manifest file that was previously read can be confirmed. If there is a declaration for the category to be registered in the manifest file as the result of the confirmation, it becomes possible to input an ID of the application according to the at least one category.

At operation 940, the category in which the application is to be included can be determined, and the process category according to FIG. 5A can be used as the category. At operation 950, it is possible to input a process ID of the application to the determined category. Through this, the above-described application can be classified into the predetermined category.

At operation 960, it is possible to operate the application of which the category classification has been completed in an individual application unit according to the category unit or setting. According to an embodiment, applications and processes that resume operations to correspond to the event that is detected through the electronic device can be determined according to the basis that appears in Table 2.

TABLE 2

| | | Hardware/software components | | | | | | | |
|---|---|---|---|---|---|---|---|---|---|
| | | Camera | Call | Message | Health | Lock screen | Music | Internet | Alarm |
| Process | Key | After user input | X | X | X | O | O | After User input | X |
| | Sensor | X | X | X | O | X | X | X | X |
| | Network | X | O | O | X | X | X | X | X |
| | Media | X | X | X | X | X | O | X | X |
| | Alarm | X | X | X | X | X | X | X | O |
| | Bluetooth | X | X | X | X | X | O | X | X |

According to various embodiments of the present disclosure, the electronic device can select one or more non-system processes that are related to one or more hardware or software components of the electronic device on the basis of at least a part of the detected event. For example, if the detected event is an event that is related to the message reception, the electronic device can select the network process as one or more non-system processes related to the detected event. The network process that is the selected non-system process can be related to activation of at least one hardware or software component in the electronic device, and with reference to Table 2 according to an embodiment, the network process can be related to activation of the call or message application.

The key process as shown in Table 2 according to an embodiment can be executed when an input from an outside is sensed. For example, an event that is related to the user's touch input or button input can be related to execution of the key process. The sensor process can be executed when an event that can be sensed through at least one sensor that is provided in the electronic device occurs. The network process can be used to send/receive data with another electronic device in addition to the electronic device that is disclosed in the present disclosure. The media process is a process that can be used to display music, video, or image through the electronic device. The alarm process is a process that can be used to notify the user of the electronic device of a signal that is generated from the electronic device. The Bluetooth process is a process that can be executed when performing data communication with another electronic device.

Table 2 according to an embodiment can be configured to include one or more hardware or software components. For example, a camera that is described in Table 2 can mean to include a camera module that is a hardware component of the electronic device or a camera application that is used to execute a camera function as a software component. Call can include an application related to a phone call, and message can mean to include an application that is used to transmit/receive text data, such as sms/nms. Health can include a hardware component, such as an HRM sensor or a software component, such as a health care application. Lock screen can include hardware or software (or application) that is related to construction of a lock screen or standby screen, and music, internet, and alarm components can include hardware or software components that correspond to music, internet, and alarm functions.

When the operation performance of the application is completed and the application is ended, the ID of the application that is input to a group according to the at least one category can be deleted at operation 970. Thereafter, the application can be ended at operation 980.

The phased resumption system according to an embodiment can exemplify that the process classification unit 610 of FIG. 6 finally makes a plurality of process categories include processes and process IDs of the applications, and as can be seen from FIGS. 5B and 5C, the process categories can be grouped into several groups to determine the resumption order thereof.

Figure 10:
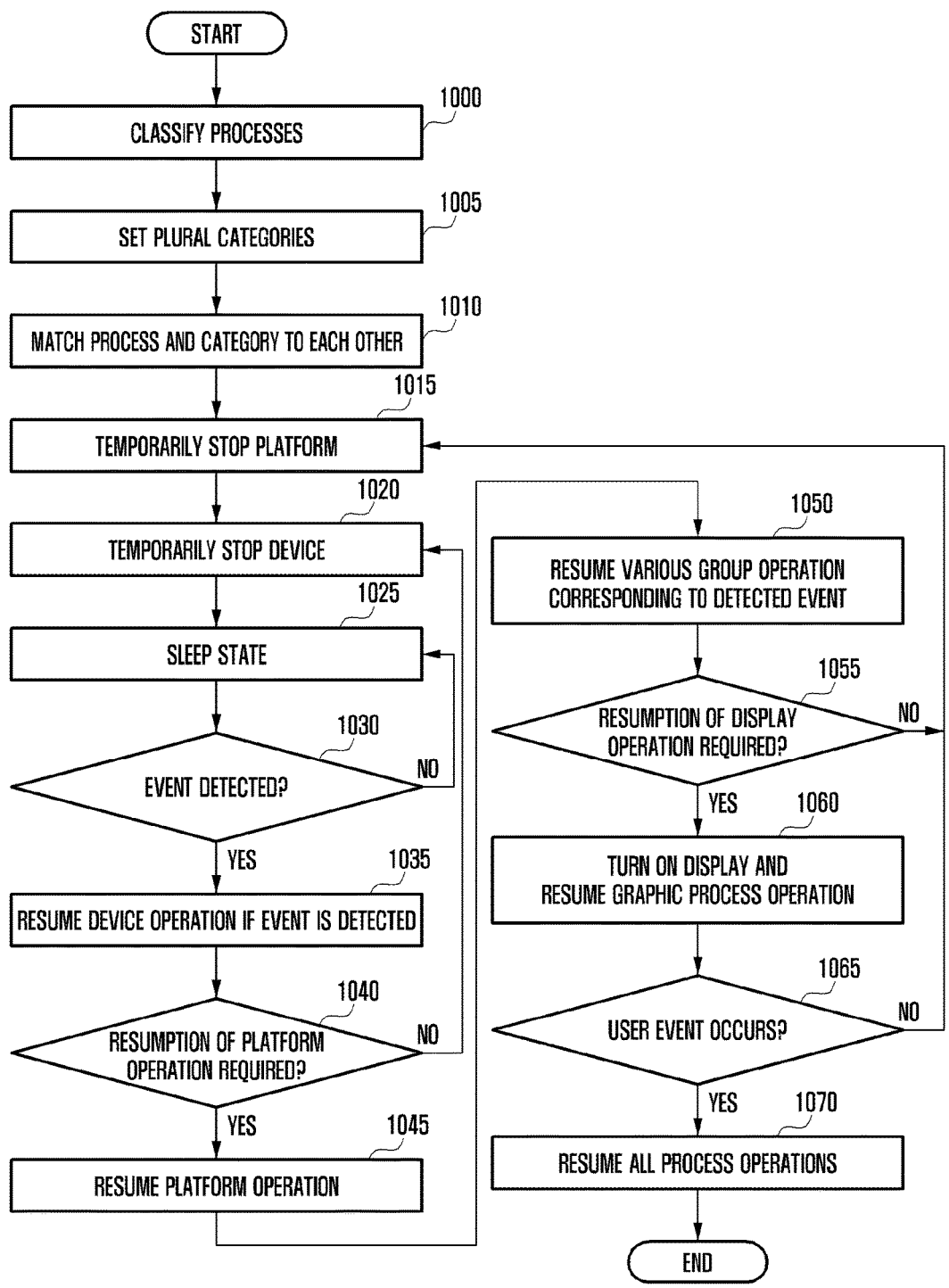
FIG. 10 is a diagram explaining an operation resumption order of a phased resumption system according to various embodiments.

FIG. 10 is a diagram explaining an operation resumption order of a phased resumption system according to various embodiments.

At operation 1000 according to an embodiment, various processes that are executed in the platform of the electronic device can be classified according to a specific basis. In the electronic device, various processes can be executed, and the various processes can be classified according to the user's setting. For example, one or more processes can be classified in the form in which only processes that perform similar functions are gathered on the basis of functions of the respective processes.

At operation 1005, the electronic device can set a plurality of categories that are related to the processes that are executed in the electronic device. The plurality of categories can be set on the basis of functions of the respective processes. For example, the plurality of categories can be configured to include a system process, a graphic process, a network process, a media process, a log process, a sensor process, a connection process, a service process, and a User Interface (UI) process. The setting of the plurality of categories can be performed to correspond to the user's setting.

At operation 1010, at least one process can be configured to be included in at least one of the plurality of categories on the basis of the plurality of categories that are set at operation 1005.

As described above, an operation of classifying the processes, an operation of setting a plurality of categories to divide the processes, and an operation of matching the classified process to at least one of the plurality of the set categories can be performed during booting of the electronic device, or can be performed with respect to all the processes that are currently operating before the electronic device that has performed an operation according to a specific event is changed to a sleep state. Further, the above-described operations can be performed just after the electronic device that is in a sleep state wakes up through reception of the operation resumption cause.

At operation 1015, a platform that has been performed in the process of performing an operation related to the operations 1000, 1005, and 1010 is temporarily stopped, and then an operation of temporarily stopping the electronic device can be performed at operation 1020. If even the electronic device is changed to a temporarily stop state, the electronic device can be switched to a sleep state as at operation 1025. Here, the sleep state can means a state in which the electronic device waits for reception of an internal event or an external input.

At operation 1030, the electronic device can determine whether at least one event or a device operation resumption cause, which can internally occur in the electronic device or which can be caused by an external device or a user, is detected. The at least one event and the device operation resumption cause can diversely occur. For example, the electronic device according to an embodiment can receive a user input from an input device 250 that is provided in the electronic device, or can receive an input signal from an external device through the communication module 220. Further, the location change of the electronic device that can be sensed through the sensor module 240 that is provided in the electronic device or various gestures, such as movement of the electronic device, can be set as the device operation resumption causes.

At operation 1035, the sleep state of the electronic device can be released to correspond to the various resumption causes as described above or an event, and the operation of the electronic device can be resumed. The operation resumption causes can be predetermined, and can be changed, added, or deleted according to user's setting.

At operation 1040, whether to resume the operation of the platform can be determined to correspond to the detected event or the received device operation resumption cause. The phased resumption system according to an embodiment can release the sleep state of the electronic device as at operation 1035 if a device operation occurrence cause is sensed. In this case, it is possible to determine whether to resume the platform most preferentially without changing all the processes to a unfreeze state. If the platform resumption is unnecessary according to the resumption cause, it is also unnecessary to change the process that is driven on the platform to the unfreeze state, and thus it is not required for the electronic device that has resumed the operation to perform an additional operation. Accordingly, the electronic device can move to operation 1020, and can enter into the temporarily stop state to prevent unnecessary scheduling from being performed.

According to the embodiment as described above, at least one event or device operation resumption cause can be input to resume the electronic device, and an additional operation resumption cause can occur simultaneously to determine whether to resume the operation of the platform. The device operation resumption cause can occur singly, or various operation resumption causes can occur simultaneously. In this case, the cause of initial resumption of the electronic device can differ from the operation resumption cause that has determined the resumption of the operation of the platform.

According to an embodiment of the present disclosure, if the resumption of the platform is required at operation 1045 according to the operation resumption cause that is received in the electronic device, the phased resumption system can determine the resumption of the platform. If the resumption of the platform is determined as described above, the resumption system can change only parts of all processes that are driven on the platform to an unfreeze state according to a predetermined basis. For example, the platform operation resumption can be determined to correspond to the operation resumption cause, and only the processes that are included in the system process category can be in an unfreeze state. For example, if the process that is required to perform an operation according to the operation resumption cause is only the system process, even unnecessary processes can be prevented from being changed to the unfreeze state in all, and an input event can be processed using only the unfreezing system process. If the resumption of the platform is determined in the phased resumption system according to an embodiment, the system process can be set to be changed to the unfreeze state. For example, the platform operation resumption and the system process execution can be simultaneously performed, and can be expressed to mean the same operations.

At operation 1050, at least one process to be executed corresponding to the event that is detected at operation 1030 can be determined. The process to be executed can be selected in the unit of a process category. For example, if the process category is selected as the at least one process to be executed corresponding to the detected event, a plurality of processes that are included in the process category can be executed.

According to an embodiment, the operation resumption order of the plurality of process categories can be determined according to a set operation resumption priority. For example, in the electronic device in which a clock screen or lock screen is displayed on the display after turn-on of the display, graphic process related settings can be corrected to improve the display function of the electronic device. More specifically, it can be set that the graphic process is executed at a platform operation resumption time or the graphic process is included in various groups, and thus the screen output can be provided simultaneously with the turn-on of the display. According to the settings for processes that can be variously constructed according to the characteristics of the electronic device, a specific process can be added to the various groups, or can be integrated with another process to adjust the resumption order to match the situation.

At operation 1055, it can be determined whether to resume the display operation. If the previously detected event is an event that requires the display operation, like operation 1060, the display operation is resumed, and the graphic process can be executed at the same time. In contrast, if the detected event does not require the display operation, the processing proceeds to operation 1015, and the platform that is currently being executed is temporarily stopped without performing the additional operation any further.

At operation 1065, it can be determined whether an additional input (or event) is received from the user in a state where the display operation is resumed. If the user input is received, like operation 1070, the electronic device can execute all the processes, and can maintain a standby state for receiving the additional user input. In contrast, if the additional user input is not received in a state where the display operates, the processing proceeds to operation 1015, and the platform that is currently being executed can be temporarily stopped.

The overall operation according to an embodiment of the present disclosure can be expressed by the following pseudo code.

```
WAKEUP_BATTERY = 0x0,
WAKEUP_KEY = 0x1.
WAKEUP_NETWORK = 0x2,
WAKEUP_SENSOR = 0x4,
WAKEUP_MEDIA = 0x8.
WAKEUP_ALARM = 0x10,
WAKEUP_BLUETOOTH = 0x20,
WAKEUP_ALARM = 0x40,
...
intCheckAllWakeupEvent( )
{
int flag = 0x0;
    while (1)
```

-continued

```
{
    /* key, network, sensor, media, internal alarm, bluetooth,
       battery and so on */
    int source = ReadWakeupEventFromDevice( );
        if (!source)
            return flag;
        flag |= source;
    }
}
intGetWakeupSource(void)
{
int flag;
    flag = CheckAllWakeupEvent( );
    return flag;
}
void WakeupGroup(intgroup_id)
{
    if (group_id == all)
WakeupAllProcess( );
    else
WakeupProcessInGroup(group_id);
}
void PlatformWakeup( )
{
int source;
    /* Firstly, wakeup system group */
WakeupGroup(Group1);
    /* Check wake Up Source */
    source = GetWakeupSource( );
                /* Wakeup each various group
                    Multiple groups can be resumed. */
    if (source & WAKEUP_NETWORK)
WakeupGroup(network_Group);
    if (source & WAKEUP_MEDIA)
WakeupGroup(media_Group);
    if (source & WAKEUP_SENSOR)
WakeupGroup(sensor_Group);
    if (source & WAKEUP_BLUETOOTH)
WakeupGroup(bluetooth_Group);
    if (source & WAKEUP_ALARM)
WakeupGroup(alarm_Group);
    /* make timer for checking LCD on request by some process */
timer_create(lcd_check_timer, 500ms, timer_cb);
}
void timer_cb( )
{
        GotoSuspend( );
}
void LcdOnRequest( )
{
timer_cancel(lcd_check_timer);
    /* Wakeup Graphic group when LCD is turned on */
WakeupGroup(Group2);
    /* make timer for checking User Input like touch or key*/
timer_create(user_input_check_timer, 10sec, timer_cb);
}
void InputRequest( )
{
timer_cancel(user_input_check_timer);
    /* Wakeup UI, service and logging processes */
WakeupGroup(Group3);
    /* Wakeup all processes that remained suspend state */
WakeupGroup(All);
}
```

The above-described pseudo code can merely be a code that is used to perform the operation of the electronic device according to an embodiment of the present disclosure, and can be corrected according to a user's intention.

According to an embodiment of the present disclosure, a method for resuming a phased platform process in an electronic device can include switching a display that is included in the electronic device from an active state to a sleep state; detecting at least one event which internally occurs in the electronic device or is caused by an external device or a user in the case where the display is in the sleep state; executing a system process if the at least one event is detected; selecting one or more non-system processes related to one or more hardware or software components of the electronic device, respectively, on the basis of at least a part of the detected event; and executing the one or more selected non-system processes by activating the one or more hardware or software components of the electronic device that are related to the one or more selected non-system processes.

The method for resuming a phased platform process in an electronic device according to an embodiment of the present disclosure can further include switching the display to an active state.

In the method for resuming a phased platform process in an electronic device according to an embodiment of the present disclosure, the selected non-system process can be related to the wireless communication circuit that is included in the electronic device.

In the method for resuming a phased platform process in an electronic device according to an embodiment of the present disclosure, the selected non-system process can be related to at least one sensor that is included in the electronic device.

The method for resuming a phased platform process in an electronic device according to an embodiment of the present disclosure can further include determining functions of the one or more non-system processes; generating a plurality of categories on the basis of the determined functions; and classifying the one or more non-system processes into at least one of the plurality of generated categories.

The method for resuming a phased platform process in an electronic device according to an embodiment of the present disclosure can further include giving an execution resumption priority with respect to the at least one of the plurality of the generated categories.

In the method for resuming a phased platform process in an electronic device according to an embodiment of the present disclosure, the execution resumption priority for the at least one category can be variable to correspond to the detected event.

The method for resuming a phased platform process in an electronic device according to an embodiment of the present disclosure can further include successively executing the one or more non-system processes that are included in the category on the basis of the priority that is given to the at least one category.

The method for resuming a phased platform process in an electronic device according to an embodiment of the present disclosure can further include freezing operations of the one or more selected non-system processes by inactivating the one or more activated hardware or software components if at least one event that is different from the detected event is not additionally detected for a predetermined time, after the at least one event is detected; freezing an operation of the system process of the electronic device; and temporarily stopping a platform of the electronic device.

As described above, although a simple configuration of the electronic device according to the present disclosure has been described, it will be apparent that the above-described components can be further subdivided or can be combined to reconfigure one or more modules according to selection of a person skilled in the art.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display; and
at least one processor configured to be functionally connected with the display,
wherein the at least one processor is further configured to:
detect at least one event which internally occurs in the electronic device or is caused by an external device or a user when the display is in the sleep state,
execute a system process if the at least one event is detected,
select one or more non-system processes related to one or more hardware or software components of the electronic device, respectively, on a basis of at least a part of the detected event,
determine functions of the one or more non-system processes,
generate a plurality of categories on the basis of the determined functions,
classify the one or more non-system processes into at least one of the plurality of the generated categories,
give an execution resumption priority with respect to the at least one of the plurality of the generated categories,
execute the one or more selected non-system processes by activating the one or more hardware or software components of the electronic device that are related to the one or more selected non-system processes,
freeze operations of the one or more selected non-system processes by inactivating the one or more hardware or software components if at least one event that is different from the detected event is not additionally detected for a predetermined time, after the at least one event is detected,
freeze an operation of the system process of the electronic device, and
temporarily stop a platform of the electronic device.

2. The electronic device of claim 1, wherein the at least one processor is further configured to switch the display to an active state.

3. The electronic device of claim 1,
wherein the electronic device is further comprising a wireless communication circuit, and
wherein the selected non-system process is related to the wireless communication circuit.

4. The electronic device of claim 1,
wherein the electronic device is further comprising a at least one sensor, and
wherein the selected non-system process is related to the at least one sensor.

5. The electronic device of claim 1, wherein the execution resumption priority for at least one category is variable to correspond to the detected event.

6. The electronic device of claim 1, wherein the at least one processor is further configured to successively execute the one or more non-system processes that are included in the category on the basis of the priority that is given to the at least one category.

7. A method for resuming a phased platform process in an electronic device, comprising:
switching a display in the electronic device from an active state to a sleep state;
detecting at least one event which internally occurs in the electronic device or is caused by an external device or a user when the display is in the sleep state;
executing a system process if the at least one event is detected;
selecting one or more non-system processes related to one or more hardware or software components of the electronic device, respectively, on a basis of at least a part of the detected event;
determining functions of the one or more non-system processes,
generating a plurality of categories on the basis of the determined functions,
classifying the one or more non-system processes into at least one of the plurality of the generated categories,
giving an execution resumption priority with respect to the at least one of the plurality of the generated categories,
executing the one or more selected non-system processes by activating the one or more hardware or software components of the electronic device that are related to the one or more selected non-system processes;
freezing operations of the one or more selected non-system processes by inactivating the one or more hardware or software components if at least one event that is different from the detected event is not additionally detected for a predetermined time, after the at least one event is detected,
freezing an operation of the system process of the electronic device, and
temporarily stopping a platform of the electronic device.

8. The method of claim 7, further comprising switching the display to an active state.

9. The method of claim 7, wherein the selected non-system process is related to a wireless communication circuit that is included in the electronic device.

10. The method of claim 7, wherein the selected non-system process is related to at least one sensor that is included in the electronic device.

11. The method of claim 7, wherein the execution resumption priority for at least one category is variable to correspond to the detected event.

12. The method of claim 7, further comprising successively executing the one or more non-system processes that are included in the category on the basis of the priority that is given to the at least one category.

* * * * *